US012585989B2

(12) United States Patent
Chen et al.

(10) Patent No.: US 12,585,989 B2
(45) Date of Patent: Mar. 24, 2026

(54) FEATURE EFFECTIVENESS ASSESSMENT METHOD AND APPARATUS, ELECTRONIC DEVICE, AND STORAGE MEDIUM

(71) Applicant: Tencent Technology (Shenzhen) Company Limited, Shenzhen (CN)

(72) Inventors: Xiaoshuang Chen, Shenzhen (CN); Chungong Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1036 days.

(21) Appl. No.: 17/703,822

(22) Filed: Mar. 24, 2022

(65) Prior Publication Data

US 2022/0215296 A1 Jul. 7, 2022

Related U.S. Application Data

(63) Continuation of application No. PCT/CN2020/123721, filed on Oct. 26, 2020.

(30) Foreign Application Priority Data

Jan. 3, 2020 (CN) .......................... 202010007053.1

(51) Int. Cl.
*G06N 20/00* (2019.01)
*G06F 18/25* (2023.01)
(Continued)

(52) U.S. Cl.
CPC ........... *G06N 20/00* (2019.01); *G06F 18/259* (2023.01); *G06F 2218/08* (2023.01); *G06N 5/01* (2023.01);
(Continued)

(58) Field of Classification Search
CPC ... G06F 2218/08; G06F 18/259; G06N 20/00; G06N 5/01; G06V 10/771; G06V 30/333; G06V 40/382; H04N 21/4826
See application file for complete search history.

(56) References Cited

U.S. PATENT DOCUMENTS 11,586,941 B2 * 2/2023 Yu ........................ G06F 16/9535
2019/0207985 A1 * 7/2019 Yuan ..................... H04L 63/205
(Continued)

FOREIGN PATENT DOCUMENTS

CN 108764486 A 11/2018
CN 109685107 A 4/2019
(Continued)

OTHER PUBLICATIONS

Song et al., "AutoInt: Automatic Feature Interaction Learning via Self-Attentive Neural Networks" Aug. 23, 2019, arXiv: 1810. 11921v2, pp. 1-10. (Year: 2019).*
(Continued)

*Primary Examiner* — Miranda M Huang
*Assistant Examiner* — Chase P. Hinckley
(74) *Attorney, Agent, or Firm* — Morgan, Lewis & Bockius LLP

(57) ABSTRACT

This application discloses a feature effectiveness assessment method performed by an electronic device. The method including: constructing a feature combination set including a plurality of feature combinations, the feature combination being a combination of original features of to-be-recommended content; obtaining feature value sets respectively corresponding to the feature combinations, the feature value sets including feature values of combined features based on the corresponding feature combination; determining weight values corresponding to the combined features based on the feature values of the combined features in the corresponding
(Continued)

feature value sets; constructing weight value sets corresponding to the feature combinations based on the weight values of the combined features; and respectively determining effectivenesses of the feature combinations based on the weight value sets of the feature combinations.

16 Claims, 5 Drawing Sheets

(51) Int. Cl.

| | | |
|---|---|---|
| G06N 5/01 | (2023.01) |
| G06V 10/771 | (2022.01) |
| G06V 30/32 | (2022.01) |
| G06V 40/30 | (2022.01) |
| H04N 21/482 | (2011.01) |

(52) U.S. Cl.
CPC .......... *G06V 10/771* (2022.01); *G06V 30/333* (2022.01); *G06V 40/382* (2022.01); *H04N 21/4826* (2013.01)

(56) References Cited

U.S. PATENT DOCUMENTS

| | | | | |
|---|---|---|---|---|
| 2019/0392351 | A1* | 12/2019 | Zuluaga | G06N 20/20 |
| 2020/0057925 | A1* | 2/2020 | Tang | G06V 10/771 |
| 2020/0057960 | A1* | 2/2020 | Aminzadeh | G06N 20/00 |
| 2020/0265466 | A1* | 8/2020 | Cheng | G06Q 30/0246 |
| 2020/0272913 | A1* | 8/2020 | Yu | G06N 3/08 |
| 2021/0065251 | A1* | 3/2021 | Qu | G06N 3/044 |
| 2021/0248651 | A1* | 8/2021 | Chang | G06F 18/10 |

FOREIGN PATENT DOCUMENTS

| | | |
|---|---|---|
| CN | 109902849 A | 6/2019 |
| CN | 109992710 A | 7/2019 |
| CN | 110119474 A | 8/2019 |
| CN | 110276369 A | 9/2019 |
| CN | 111242310 A | 6/2020 |
| WO | WO 2005008572 A1 | 1/2005 |

OTHER PUBLICATIONS

Cheng et al., "Interpretable Click-Through Rate Prediction Through Hierarchical Attention" Feb. 19, 2019, U.S. Appl. No. 62/807,258, pp. i-11. (Year: 2019).*

Bonnet, Alexandre, "Accuracy vs. Precision vs. Recall in Machine Learning: What is the Difference?" Nov. 23, 2023, pp. 1-13. (Year: 2023).*

Ouyang et al., "Deep Spatio-Temporal Neural Networks for Click-Through Rate Prediction" Jul. 19, 2019, arXiv: 1906.03776v2, pp. 1-9. (Year: 2019).*

Chen et al., "GLA-Net: An Attention Network with Guided Loss for Mismatch Removal" Sep. 28, 2019, arXiv: 1909.13092v1, pp. 1-8. (Year: 2019).*

Wu et al., "Cross-Entropy Adversarial View Adaptation for Person Re-identification" Jul. 23, 2019, arXiv: 1904.01755v2, pp. 1-12. (Year: 2019).*

Liu et al., "Feature Generation by Convolutional Neural Network for Click-Through Rate Prediction" Apr. 9, 2019, arXiv: 1904.04447v1, pp. 1-11. (Year: 2019).*

Xu et al. (Anonymous), "Learning Representations of Categorical Feature Combinations via Self-Attention" Sep. 27, 2018, openReview, pp. i-10. (Year: 2018).*

Huang et al., "FiBiNet: Combining Feature Importance and Bilinear feature Interaction for Click-Through Rate Prediction" May 23, 2019, arXiv: 1905.09433v1, pp. 1-8. (Year: 2019).*

Ouyang et al., "Click-Through Rate Prediction with the User Memory Network" Jul. 20, 2019, arXiv: 1907.04667v2, pp. 1-4. (Year: 2019).*

Wang et al., "Regularized Adversarial Sampling and Deep Time-aware Attention for Click-Through Rate Prediction" Nov. 3, 2019, arXiv: 1911.00886v1, pp. 1-10. (Year: 2019).*

Tencent Technology, ISR, PCT/CN2020/123721, Jan. 27, 2021, 2 pgs.

Tencent Technology, WO, PCT/CN2020/123721, Jan. 27, 2021, 5 pgs.

Tencent Technology, IPRP, PCT/CN2020/123721, Jul. 5, 2022, 6 pgs.

* cited by examiner

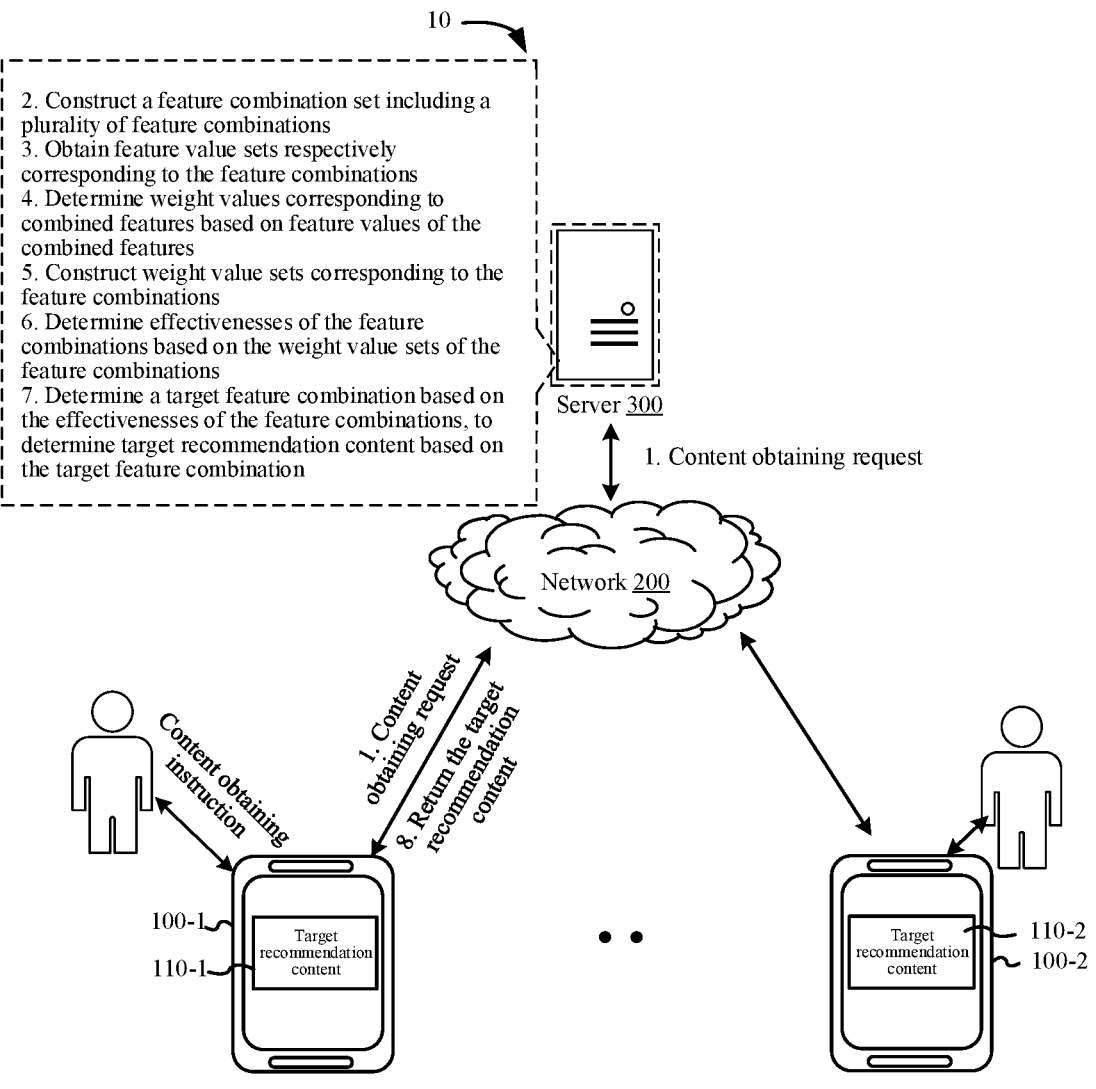

2. Construct a feature combination set including a plurality of feature combinations
3. Obtain feature value sets respectively corresponding to the feature combinations
4. Determine weight values corresponding to combined features based on feature values of the combined features
5. Construct weight value sets corresponding to the feature combinations
6. Determine effectivenesses of the feature combinations based on the weight value sets of the feature combinations
7. Determine a target feature combination based on the effectivenesses of the feature combinations, to determine target recommendation content based on the target feature combination Server 300

1. Content obtaining request

Network 200

Content obtaining instruction

1. Content obtaining request

8. Return the target recommendation content

Target recommendation content

Target recommendation content

FIG. 1

Electronic device
20

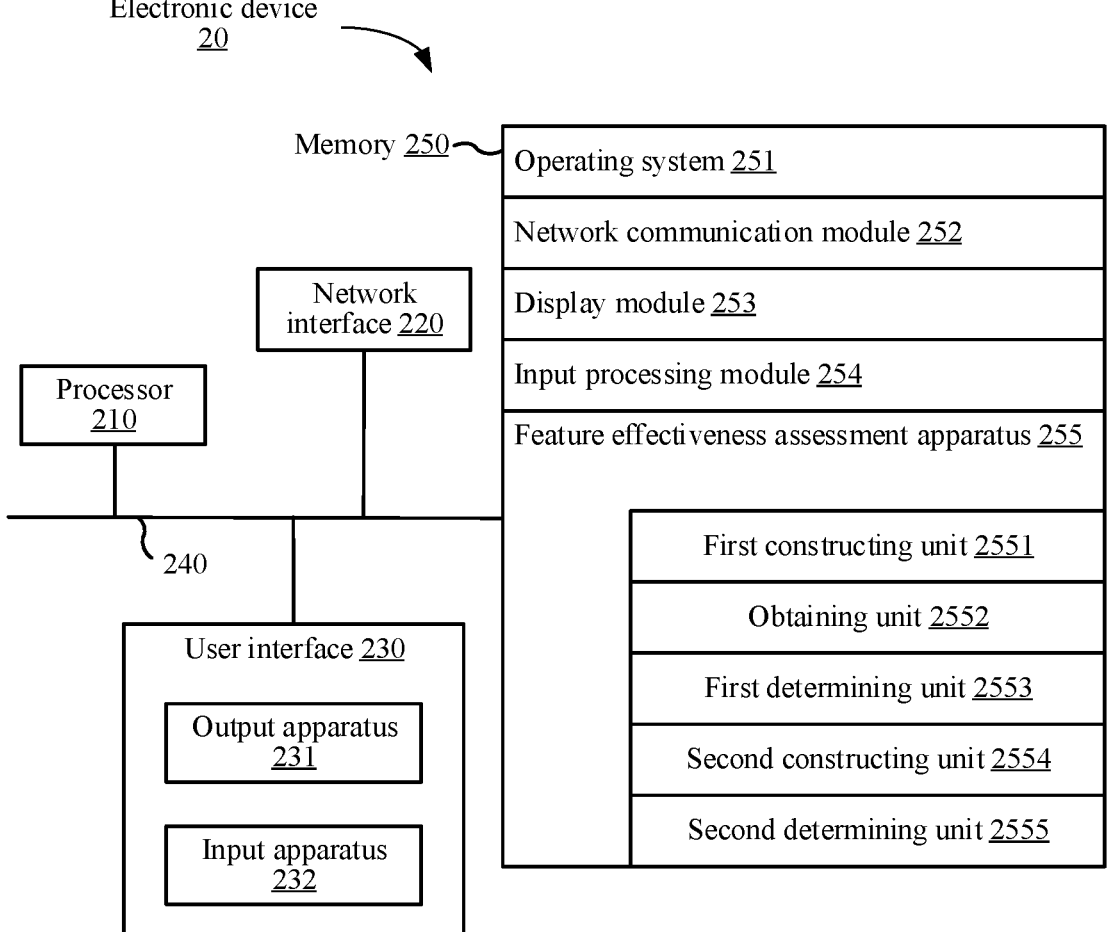

Memory 250

Operating system 251

Network communication module 252

Display module 253

Input processing module 254

Feature effectiveness assessment apparatus 255

First constructing unit 2551

Obtaining unit 2552

First determining unit 2553

Second constructing unit 2554

Second determining unit 2555

Network interface 220

Processor 210

240

User interface 230

Output apparatus 231

Input apparatus 232

FIG. 2

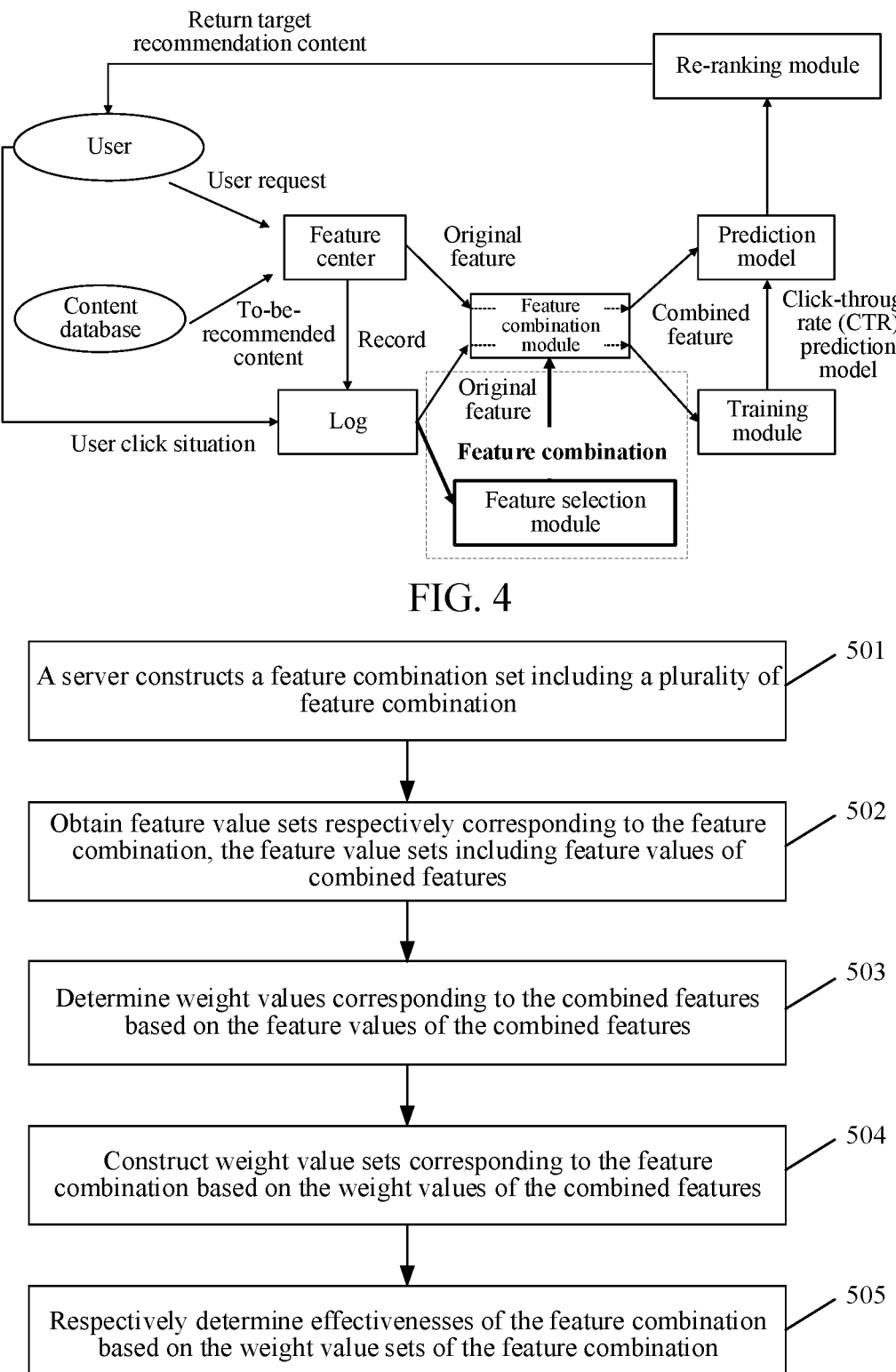

FIG. 4

A server constructs a feature combination set including a plurality of feature combination — 501

Obtain feature value sets respectively corresponding to the feature combination, the feature value sets including feature values of combined features — 502

Determine weight values corresponding to the combined features based on the feature values of the combined features — 503

Construct weight value sets corresponding to the feature combination based on the weight values of the combined features — 504

Respectively determine effectivenesses of the feature combination based on the weight value sets of the feature combination — 505

FIG. 5

FEATURE EFFECTIVENESS ASSESSMENT METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2020/123721, entitled "FEATURE VALIDITY EVALUATION METHOD AND APPARATUS, AND ELECTRONIC DEVICE AND STORAGE MEDIUM" filed on Oct. 26, 2020, which claims priority to Chinese Patent Application No. 202010007053.1, filed with the State Intellectual Property Office of the People's Republic of China on Jan. 3, 2020, and entitled "FEATURE VALIDITY EVALUATION METHOD AND DEVICE, ELECTRONIC EQUIPMENT AND STORAGE MEDIUM", all of which are incorporated herein by reference in their entirety.

FIELD OF THE TECHNOLOGY

This application relates to machine learning (ML) technologies in the field of artificial intelligence (AI), and in particular, to a feature effectiveness assessment method and apparatus, an electronic device, and a storage medium.

BACKGROUND OF THE DISCLOSURE

Artificial intelligence (AI) is a theory, method, technology, and an application system in which a digital computer or a machine controlled by a digital computer is used for simulating, extending, and expanding human intelligence, perceiving an environment, acquiring knowledge, and using the knowledge to obtain an optimal result.

Content recommendation is an application direction of AI, which specifically makes research on recommending content of interest to a client, to achieve an objective of content promotion. A click-through rate (CTR) of the content on the client is an important indicator for determining the content recommended to the client. The combination of different features may provide effective information for CTR prediction. Therefore, selecting an appropriate feature combination to combine the features is of great significance in content recommendation, and assessing the effectiveness of the feature combination is a key link.

In the related art, an experimental method or a model training method is mainly used for assessing the effectiveness of the feature combination. However, such assessment methods in the related art cannot quickly assess effectivenesses of a large quantity of feature combinations.

SUMMARY

Embodiments of this application provide a feature effectiveness assessment method and apparatus, an electronic device, and a storage medium, to improve efficiency of assessing effectivenesses of a large quantity of feature combinations.

An embodiment of this application provides a feature effectiveness assessment method performed by an electronic device, the method including:

constructing a feature combination set including a plurality of feature combinations, the feature combination being a combination of original features of to-be-recommended content;

obtaining feature value sets respectively corresponding to the feature combinations, the feature value sets including feature values of combined features based on the corresponding feature combination;

determining weight values corresponding to the combined features based on the feature values of the combined features in the corresponding feature value sets;

constructing weight value sets corresponding to the feature combinations based on the weight values of the combined features; and respectively determining effectivenesses of the feature combinations based on the weight value sets of the feature combinations, the effectiveness being used for predicting an accuracy of performing content recommendation according to features obtained based on the corresponding feature combination.

An embodiment of this application further provides an electronic device, including:

a processor, a memory, and executable instructions stored in the memory; and the executable instructions stored in the memory, when executed by the processor, causing the electronic device to perform the aforementioned feature effectiveness assessment method.

An embodiment of this application further provides a non-transitory computer-readable storage medium storing executable instructions, the executable instructions, when executed by a processor of an electronic device, causing the electronic device to perform the aforementioned feature effectiveness assessment method.

The feature effectiveness assessment method and apparatus, the electronic device, and the storage medium provided in the embodiments of this application are applied. For a given feature combination set including a plurality of feature combinations, feature value sets respectively corresponding to the feature combinations are obtained, the feature value sets herein including feature values of combined features; weight values corresponding to the combined features are determined based on the feature values of the combined features; and weight value sets corresponding to the feature combinations are constructed based on the weight values of the combined features. In this way, effectivenesses of the feature combinations can be determined based on the weight value sets of the feature combinations, and effectivenesses of a large quantity of feature combinations can be assessed in a short time without performing time-consuming experiments and model training, thereby improving the efficiency of assessing the effectivenesses of the large quantity of feature combinations, and improving the recommendation effect of a recommendation system.

BRIEF DESCRIPTION OF THE DRAWINGS

FIG. 1 is a schematic architectural diagram of a feature effectiveness assessment system 10 according to an embodiment of this application.

FIG. 2 is a schematic structural diagram of hardware of an electronic device 20 according to an embodiment of this application.

FIG. 4 is a schematic structural diagram of a recommendation system according to an embodiment of this application.

FIG. 5 is a schematic flowchart of a feature effectiveness assessment method according to an embodiment of this application.

DESCRIPTION OF EMBODIMENTS

Figure 3:
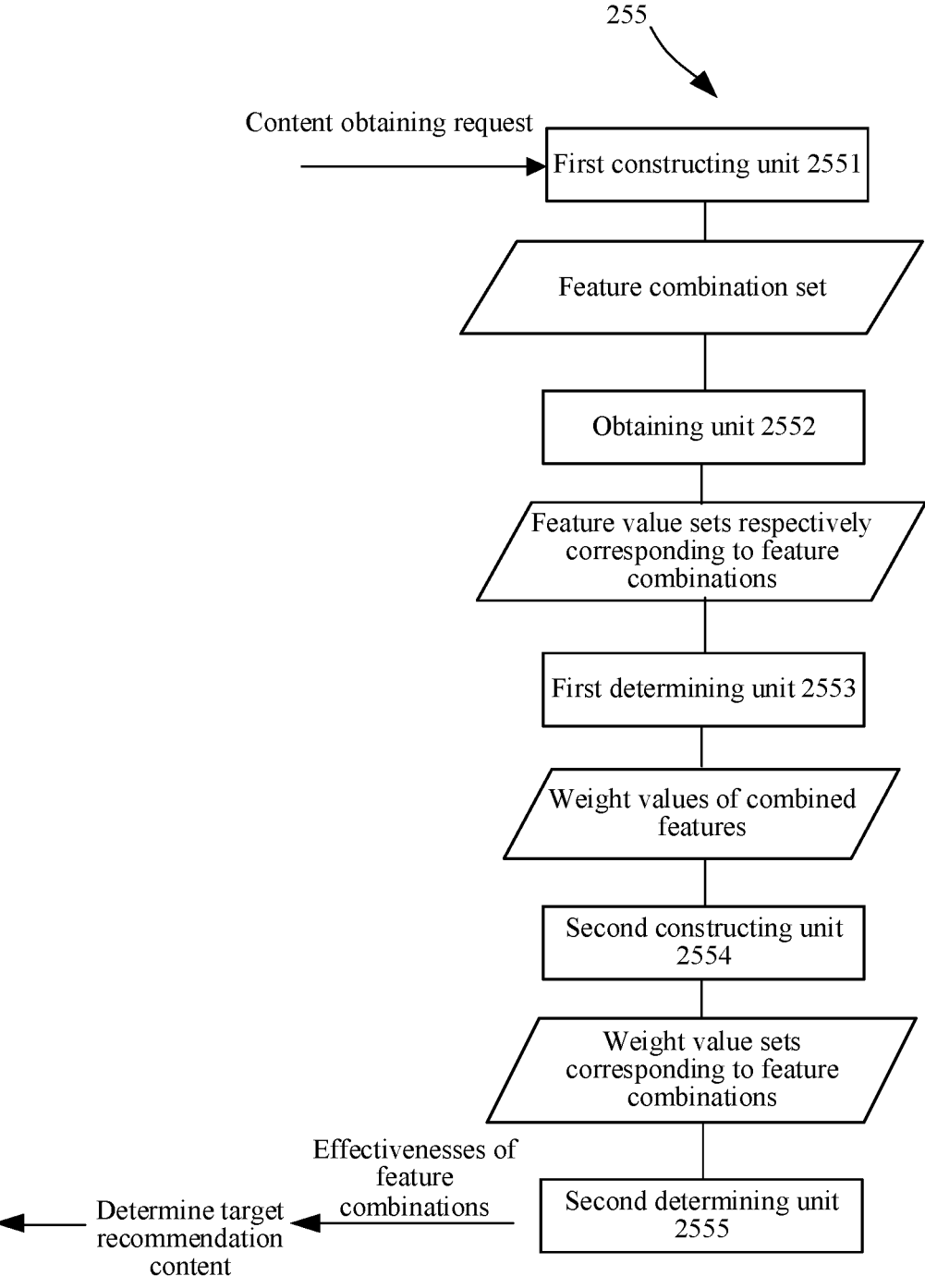
FIG. 3 is a schematic diagram of a composition structure of a feature effectiveness assessment apparatus 255 according to an embodiment of this application.

To make the objectives, technical solutions, and advantages of the embodiments of this application clearer, the following further describes this application in detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the involved terms such as "first" and "second" are merely intended to distinguish similar objects but does not necessarily indicate a specific order or sequence of an object. It may be understood that "first" and "second" are interchangeable in terms of a specific order or sequence if permitted, so that the embodiments of this application described herein can be implemented in a sequence in addition to the sequence shown or described herein.

Unless otherwise defined, meanings of all technical and scientific terms used in the embodiments of this application are the same as those generally understood by a person skilled in the art to which the embodiments of this application belong. Terms used in this application are merely intended to describe specific embodiments, but are not intended to limit this application.

Before the embodiments of this application are further described in detail, nouns and terms involved in the embodiments of this application are described. The nouns and terms provided in the embodiments of this application are applicable to the following explanations.

1) A recommendation system, in which content recommendation is an important application, and the content recommendation is a process of selecting content in which a user is interested from a large quantity of pieces of to-be-recommended content according to user requirements and recommending the selected content to the user. The to-be-recommended content may be a media file, an item, or the like, and the item herein may be a specific product or commodity.

2) A media file refers to a media file in various forms (such as video, audio, graphics, or other media forms) that can be obtained on the Internet, for example, a video file presented on a client, an article including graphics (such as a web article or a new media article), a piece of news, an advertisement, or the like.

3) A click-through rate (CTR) refers to a ratio of a quantity of times that a specific to-be-recommended content in a client is clicked by a user to a quantity of times that the to-be-recommended content in the client is displayed. In other words, the CTR is a probability that the to-be-recommended content is clicked by the user. The CTR of the user is a very important indicator in the recommendation system. Especially, in an online recommendation system, predicting the CTR of the user on a piece of specific to-be-recommended content to determine whether to recommend the to-be-recommended content to the user is an important way to improve user experience.

4) CTR prediction is a method for predicting a CTR, which may also be referred to as a CTR prediction algorithm. Such an algorithm is an algorithm for predicting a probability that a user clicks specific to-be-recommended content under a specific background according to related information of the user and the to-be-recommended content, and other background information (such as occurrence time of a clicking behavior, a network environment of the user, and a used terminal device such as a smart phone or a computer).

The CTR prediction algorithm may be generally implemented based on a specific mathematical model (such as a CTR prediction model). An input feature of the model may be an original feature or a combined feature to provide effective information for predicting the CTR.

5) An original feature refers to a feature directly obtained from a sample, and the original feature may include a user feature, a content feature, or a background environment feature. The user feature may be, for example, user identification (user ID), user hobbies, user gender, user age, and the like; the content feature may be, for example, content identification (content ID), content classification, content tag, and the like; and the background environment feature may be, for example, user access time, network environment (such as Wi-Fi or cellular mobile network) in which the user is assessing, and the like.

6) A combined feature refers to a feature obtained by performing feature combination on one or more original features, and values of the combined feature need to traverse all possible feature combinations of the original features.

For example, when there are two original features: a feature 1 and a feature 2, a value range of the feature 1 is A and B, and a value range of the feature 2 is C, D, and E, a plurality of combined features with a value range of AC, AD, AE, BC, BD, and BE may be obtained by performing feature combination on the feature 1 and the feature 2; and when the two original features are "feature 1: A and feature 2: C", a combined feature correspondingly obtained is AC. The above is an exemplary description of obtaining a combined feature by performing feature combination on two original features (feature 1 and feature 2). Based on the foregoing similar method, feature combination can be performed on a plurality of original features (for example, more than two original features) to correspondingly obtain a plurality of combined features.

7) A feature combination refers to a manner of performing feature combination on original features to obtain a combined feature, and the combined feature refers to a corresponding specific feature value in the feature combination. For example, "user ID-content tag" is a feature combination, and "David-basketball" is a feature value of a corresponding combined feature in the feature combination.

8) Feature engineering refers to a process of selecting an appropriate original feature and feature combination. In the recommendation system, the efficiency of feature engineering directly affects the recommendation effect of the recommendation system. Therefore, feature engineering is an extremely important processing link in the recommendation system.

9) The expression "in response to" is used for representing a condition or state on which one or more to-be-performed operations depend. In a case that the condition or state is met, the one or more operations may be performed immediately or have a set delay; and there is no limitation to the sequence of performing the operations unless explicitly stated.

The feature effectiveness assessment method provided in the embodiments of this application can be applied to a recommendation system, and relates to artificial intelligence (AI). AI is a comprehensive technology of computer science and attempts to understand the essence of intelligence and produce a new intelligent machine that can react in a way similar to human intelligence. AI is to study design principles and implementation methods of various intelligent machines, to enable the machines to have functions of perception, reasoning, and decision-making.

Machine learning (ML) is a multi-field interdiscipline, and relates to a plurality of disciplines such as a probability theory, statistics, an approximation theory, a convex analysis, and an algorithm complexity theory. ML specializes in studying how a computer simulates or implements a human learning behavior to obtain new knowledge or skills, and reorganize the existing knowledge structure, so as to keep improving performance of the computer. ML is the core of AI, is a basic way to make the computer intelligent, and is applied to various fields of AI. In the embodiments of this application, effectivenesses of a large quantity of feature combinations are assessed by using ML, so that the effectivenesses of the large quantity of feature combinations can be assessed in a short time without performing time-consuming experiments and model training, thereby improving the efficiency of assessing the effectivenesses of the feature combinations, and improving the recommendation effect of the recommendation system.

In feature engineering, a common problem is how to assess the effectiveness of a feature combination to determine, according to an assessment result, whether a combined feature combined in the feature combination can be added to a CTR prediction model to provide effective information for predicting a CTR. To resolve the technical problem, a solution for assessing the effectiveness of a feature combination is provided in the related art.

In some solutions in the related art, the effectiveness of a feature combination is assessed mainly based on experimental results of a large quantity of experiments. Practitioners need to select, according to experience, some candidate features combined in the feature combination, which requires the practitioners to have a relatively high degree of familiarity to products and a relatively good sensitivity to data to select appropriate features. Different practitioners have different experience, and therefore, a method for artificially selecting features requires a large quantity of trial-and-error links in which both quality and speed are difficult to be effectively ensured and experiments are very time-consuming. In a case that there are a large quantity of feature combinations, it is quite slow and consumes a lot of calculation resources to assess the effectiveness of each feature combination through experiments, and an extremely limited quantity of feature combinations can be assessed within a limited time, greatly reducing the efficiency of assessing effectivenesses of a large quantity of feature combinations.

In some other solutions of the related art, the effectiveness of a feature combination can be assessed by using a full training method. In actual implementation, first, original features are combined in a to-be-assessed feature combination to obtain different features, and then, after the full training method is performed on each feature, a model including the feature is obtained through one full model training, and the prediction effect of the model is assessed and used as a basis for assessing the effectiveness of the feature combination. A stochastic gradient descent (SGD) method or other modification methods are generally adopted in the model training. However, the main problem of the full training method is that the calculating is relatively slow and a lot of time is required for training, restricting the ability of practitioners to try more features, and further affecting the efficiency of feature engineering.

Descriptions are made below by using an example in which the full training method is a gradient boosting decision tree method (referred to as a decision tree method). In the decision tree method, an original feature is mapped to a new feature according to a plurality of determination conditions. For example, in the decision tree method, all samples are divided into 10 groups. Samples meeting a condition of males aged between 20 and 25 are regarded as the first group, and samples meeting a condition of females aged between 20 and 25 are regarded as the second group, and so on. In the decision tree method, assessment is performed by using information gain, an information gain ratio, and a Gini coefficient when the effectiveness of a specific candidate feature combination is determined.

However, the decision tree method is mainly applicable to feature engineering of continuous features and discrete features (such as gender) with only a small quantity of values. Such a method is relatively effective in early recommendation systems, but current recommendation systems have a large quantity of discrete features referred to as ID features, i.e., user IDs, content IDs, and the like. Such features have a large quantity of possible values, and the decision tree method is very sensitive to the quantity of feature values. Therefore, when the effectiveness is determined, there are problems such as failing to be applied to an online recommendation system due to the extremely high complexity of a model and inaccurate determining, making it difficult to apply the decision tree method to an industrial recommendation system.

In view of this, the solutions in the related art cannot quickly assess effectivenesses of a large quantity of feature combinations. To resolve at least the foregoing technical problems in the related art, the embodiments of this application provide a feature effectiveness assessment method. Feature value sets respectively corresponding to feature combinations are obtained, the feature value sets herein including feature values of combined features; weight values corresponding to the combined features are determined based on the feature values of the combined features; and weight value sets corresponding to the feature combinations are constructed based on the weight values of the combined features. In this way, effectivenesses of the feature combinations can be determined based on the weight value sets of the feature combinations, and the efficiency of assessing effectivenesses of a large quantity of feature combinations is improved. In addition, an appropriate target feature combination can be further selected based on the effectivenesses of the feature combinations, and a target combined feature is obtained based on the target feature combination for a recommendation system to perform content recommendation, thereby greatly improving the efficiency of feature engineering, achieving a more accurate CTR prediction, providing powerful technical support for the recommendation system, and improving the recommendation effect of the recommendation system.

The following describes an exemplary application of an electronic device configured to implement the feature effectiveness assessment method in the embodiments of this application. The electronic device provided in the embodiments of this application may be implemented as various types of terminal devices such as a notebook computer, a tablet computer, a desktop computer, a set-top box, or a mobile device (for example, a mobile phone, a portable music player, a personal digital assistant, a dedicated message device, or a portable game device), or may be implemented as a server. The server may include but is not limited to any hardware device that is capable of performing computation, for example, may be an independent physical server, or may be a server cluster or a distributed system including a plurality of physical servers, or may be a cloud server that provides basic cloud computing services such as a cloud service, a cloud database, cloud computing, a cloud function, cloud storage, a network service, cloud communication, a middleware service, a domain name service, a security service, and a big data and artificial intelligence platform. Certainly, the feature effectiveness assessment method in the embodiments of this application may also be implemented by a terminal device and a server in cooperation. The server herein may be a cloud server, but the embodiments of this application are not limited thereto.

An exemplary application of the feature effectiveness assessment system is described below with reference to the accompanying drawings by using an example in which the feature effectiveness assessment method is implemented by the terminal device and the server in cooperation. FIG. 1 is an exemplary schematic architecture diagram of a feature effectiveness assessment system 10 according to an embodiment of this application. To support an exemplary application, terminals 100 (where a terminal 100-1 and a terminal 100-2 are shown as an example) are connected to a server 300 by using a network 200. The network 200 may be a wide area network, a local area network, or a combination thereof, and data transmission is implemented by using a radio link.

In some embodiments, the terminal 100 (such as the terminal 100-1) is triggered to transmit a content obtaining request to the server 300 based on a content obtaining instruction, to request to obtain content of interest.

The server 300 is configured to construct a feature combination set including a plurality of feature combinations in response to the content obtaining request transmitted by the terminal 100; obtain feature value sets respectively corresponding to the feature combinations; determine weight values corresponding to the combined features based on the feature values of the combined features; construct weight value sets corresponding to the feature combinations based on the weight values of the combined features; and respectively determine effectivenesses of the feature combinations based on the weight value sets of the feature combinations.

Next, the server 300 is further configured to determine a target feature combination based on the effectivenesses of the feature combinations, so as to determine target recommendation content based on the target feature combinations. In actual implementation, the effectivenesses of the feature combinations may be ranked to obtain a corresponding ranking result, so that a target quantity of feature combinations are selected from the feature combination set based on the ranking result. The selected feature combinations are used as target feature combinations, and feature combination is performed on original features of to-be-recommended content based on the target feature combinations to obtain target combined features, to determine a CTR of a target user on the to-be-recommended content based on the target combined features, determine the target recommendation content based on the CTR, and push the target recommendation content to the terminal 100.

In an actual application, the server 300 may be a separately configured server supporting various services, or may be configured as a server cluster.

The terminal 100 may present the target recommendation content in a graphical interface 110 (such as a graphical interface 110-1 of the terminal 100-1 or a graphical interface 110-2 of the terminal 100-2) after receiving the target recommendation content.

The following further describes the hardware structure of an electronic device configured to implement the feature effectiveness assessment method in the embodiments of this application. The electronic device may be implemented as a terminal device or a server, or may be implemented as a coordinated implementation of the terminal device and the server shown in FIG. 1.

FIG. 2 is an exemplary schematic structural diagram of hardware of an electronic device 20 according to an embodiment of this application. It is to be understood that FIG. 2 merely shows an exemplary structure rather than a complete structure of the electronic device. The structure shown in FIG. 2 may be partially or entirely implemented based on requirements. The electronic device 20 provided in the embodiments of this application may include: at least one processor 210, a memory 250, at least one network interface 220, and a user interface 230. All the components in the electronic device 20 are coupled together by using a bus system 240. It is to be understood that the bus system 240 is configured to implement connection and communication between such components. In addition to a data bus, the bus system 240 further includes a power bus, a control bus, and a state signal bus. However, for ease of clear description, all types of buses are marked as the bus system 240 in FIG. 2.

The processor 210 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 230 includes one or more output apparatuses 231 that enable presentation of media content, including one or more speakers and/or one or more visualization display screens. The user interface 230 further includes one or more input apparatuses 232, including user interface components helping a user input, such as a keyboard, a mouse, a microphone, a touch display screen, a camera, and other input buttons and controls.

The memory 250 may be a removable memory, a non-removable memory, or a combination thereof. Exemplary hardware devices include a solid-state memory, a hard disk drive, an optical disc driver, and the like. The memory 250 includes one or more storage devices physically away from the processor 210.

The memory 250 includes a volatile memory or a non-volatile memory, or may include both a volatile memory and a non-volatile memory. The non-volatile memory may be a read-only memory (ROM), and the volatile memory may be a random access memory (RAM). The memory 250 described in the embodiments of this application is to include any other suitable type of memories.

In some embodiments, the memory 250 may store data to support various operations. Examples of the data include programs, modules, and data structures, or a subset or a superset thereof. Exemplarily descriptions are made below.

An operating system 251 includes a system program configured to process various basic system services and perform a hardware-related task, for example, a framework layer, a core library layer, and a driver layer, and is configured to implement various basic services and process a hardware-related task.

A network communication module 252 is configured to reach another computing device through one or more (wired or wireless) network interfaces 220. An exemplary network interface 220 includes: Bluetooth, wireless fidelity (WiFi), a universal serial bus (USB), or the like.

A display module 253 is configured to display information by using an output apparatus 231 (for example, a display screen or a speaker) associated with one or more user interfaces 230 (for example, a user interface configured to operate a peripheral and display content and information).

An input processing module 254 is configured to detect one or more user inputs or interactions from one of the one or more input apparatuses 232 and translate the detected input or interaction.

In some embodiments, a feature effectiveness assessment apparatus provided in the embodiments of this application may be implemented by using software. FIG. 2 shows a feature effectiveness assessment apparatus 255 stored in a memory 250. The feature effectiveness assessment apparatus 255 may be software in the form of a program or a plug-in and includes a series of software modules. FIG. 3 is an exemplary schematic diagram of a composition structure of a feature effectiveness assessment apparatus 255 according to an embodiment of this application. For example, the feature effectiveness assessment apparatus 255 may include a first constructing unit 2551, an obtaining unit 2552, a first determining unit 2553, a second constructing unit 2554, and a second determining unit 2555. Such units have logical function and may be randomly combined or divided according to functions implemented by the software modules. Functions of the units of the feature effectiveness assessment apparatus 255 provided in the embodiments of this application shown in FIG. 3 are described below.

In some other embodiments, the feature effectiveness assessment apparatus 255 provided in the embodiments of this application may be implemented by using hardware. For example, the feature effectiveness assessment apparatus 255 provided in the embodiments of this application may be a processor in the form of a hardware decoding processor, programmed to perform the feature effectiveness assessment method provided in the embodiments of this application. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic elements.

The structure of a recommendation system to which the feature effectiveness assessment method is applied is first described with reference to the foregoing description of the feature effectiveness assessment system and the electronic device provided in the embodiments of this application before describing the feature effectiveness assessment method provided in the embodiments of this application.

FIG. 4 is a schematic structural diagram of a recommendation system according to an embodiment of this application. The recommendation system may be implemented as a server. The server receives a user request transmitted by a terminal, extracts to-be-recommended content from a content database according to the user request (where the user request may include information such as a user ID and a current time), and transfers both the user request and the to-be-recommended content to a feature center. The feature center sorts out related information of the user request and the to-be-recommended content into a structured form (such as a string list, or a key-value pair), so as to obtain original features (such as user ID, user age, and content ID) of the to-be-recommended content, and transfer the original features to a feature combination module.

In this embodiment of this application, a feature selection module is added to the recommendation system. Feature combinations are selected by using the feature selection module, to look for an effective feature combination. For example, an effective feature combination is "user ID-content tag". The feature combination module may perform feature combination on one or more original features based on the effective feature combination provided by the feature selection module, to obtain a plurality of combined features (for example, a combined feature obtained based on the effective feature combination "user ID-content tag" is "David-basketball"). Next, the combined feature is used as an input feature and inputted into a CTR prediction module to predict a CTR of a user on the to-be-recommended content. Next, a re-ranking module ranks the to-be-recommended content according to the obtained CTR, to select a target quantity of pieces of content from the to-be-recommended content as target recommendation content. Then the recommendation system returns the target recommendation content to the user.

In actual implementation, the feature selection module selects an effective feature combination (such as user ID-content tag) according to offline log data recorded in the feature center, and updates feature combinations in the feature combination module, so that the feature combination module outputs an effective combined feature and performs training for a content recommendation model or performs online CTR prediction based on the combined feature.

The recommendation system stores original features, recommendation results, and click situations of the user used in each recommendation process into logs while implementing online content recommendation. Such logs can be used for obtaining a weight value of each value (for example, a feature combination is "user ID-content tag", and a feature value of a specific combined feature corresponding to the effective feature combination is "David-basketball") of each of combined features, to quickly predict effectivenesses of a plurality of feature combinations, so that a target feature combination is determined based on the effectivenesses of the plurality of feature combinations to guide subsequent recommendation operations.

Logs and a CTR prediction model are described below. A log system extracts user click data (that is, samples) within a specific time range, and sorts out each sample into the following format: $(y^{(i)}, \hat{y}^{(i)}, x^{(i)})$, where i represents the $i^{th}$ log; $y^{(i)}$ represents a click result indicating whether the user clicks or not; $\hat{y}^{(i)}$ is a predicted CTR of the sample, which is a value ranges from 0 to 1; and $x^{(i)}$ is an original feature ranked by the feature center and can be recorded as a form of a key-value pair, i.e., "user ID: David; user ID: content A; media followed by a user: media A or media B; content tag: basketball", or the like. The original feature may be a single value (such as user ID), or a plurality of values (such as media followed by a user, which is generally more than one).

The CTR prediction model generally predicts, according to an input feature (such as a user feature, a content feature, or a background environment feature), a probability (that is, a CTR, which is a real number between 0 and 1) that the user clicks on content in a current environment by using a specific algorithm. The CTR prediction model is generally modeled into the following form: $\hat{y}^{i}=f(x^{(i)})$. There are a plurality of types of common CTR prediction models, such as a logistic regression (LR) model or a deep neural network (DNN) model. The type of the CTR prediction model is not limited in the embodiments of this application.

The implementation of the feature effectiveness assessment method provided in the embodiments of this application is described with reference to the feature effectiveness assessment system, the exemplary application of the electronic device, and the recommendation system provided in the embodiments of this application.

FIG. 5 is a schematic flowchart of a feature effectiveness assessment method according to an embodiment of this application. In some embodiments, the feature effectiveness assessment method may be implemented by a terminal or a server. Certainly, the method may alternatively be implemented by a server or a terminal in cooperation. A description is made below with reference to steps shown in FIG. 5 by using an example in which the feature effectiveness assessment method is implemented by the server, for example, implemented by the server 300 shown in FIG. 1.

Step 501: A server constructs a feature combination set including a plurality of feature combinations.

In this embodiment of this application, the feature combination is a combination of original features of to-be-recommended content. In an actual application, related features, i.e., a user feature and a content feature of the to-be-recommended content need to be extracted when the server performs content recommendation by using the foregoing recommendation system, so that features such as the user feature and the content feature are combined to obtain related combined features to improve the precision of content recommendation.

In some embodiments, the server may construct the feature combination set by using the following method: obtaining a plurality of original features; determining a plurality of feature combinations obtained by combining at least two original features of the plurality of original features; and constructing the feature combination set based on the plurality of original features and the plurality of feature combinations.

The plurality of original features herein are original features including the user feature and the content feature. For example, the plurality of original features may be user features such as "user ID" and "media followed by the user" and content features such as "posting media", "content tag", and the like.

Specifically, during construction of the feature combination set, the plurality of original features need to be first obtained, and at least two features are selected from the plurality of original features for a plurality of times and combined to obtain the plurality of feature combinations. For example, the plurality of original features include "user ID, media followed by the user, posting media, and content tag", two original features are selected randomly and combined, so that a plurality of feature combinations such as "user ID-media followed by the user", "user ID-posting media", and "media followed by the user-content tag" may be obtained. In actual implementation, in addition to randomly selecting two original features, three original features may alternatively be selected randomly for combination, which is not limited herein. The feature combination set is constructed based on the plurality of feature combinations and the plurality of original features after the plurality of feature combinations are obtained. Because the plurality of original features may be regarded as a special feature combination, the obtained plurality of feature combinations and the plurality of original features may be all used as feature combinations in the feature combination set. In this way, the feature combination set is constructed.

For example, the feature combination set may be constructed by using the following method: first, combining all the obtained original features to obtain D1 $D_1=\{$feature 1, feature 2, . . . , and feature n$\}$; next, combining any two features in the plurality of original features in pair to construct the plurality of feature combinations, which is represented by D2: $D_2=\{$(feature 1, feature 1), . . . (feature 1, feature n), . . . , and (feature n, feature n)$\}$; and finally, constructing a set $D=D_1 \cup D_2$, that is, the feature combination set including the plurality of feature combinations.

When $D_2$ is obtained by combining the original features in pairs, for example, according to the priori knowledge, the user feature may be only combined with the content feature, or the user feature may be only combined with the background environment feature, so that a relatively small quantity of features are traversed and the calculation amount of a processor is reduced. However, in an actual application, when the processor has a strong computation capability, a feature obtained by combining more than two simple features can be further used as a candidate feature, and the feature combination set is further generated until all candidate features are traversed to construct a plurality of feature combinations.

Step 502: Obtain feature value sets respectively corresponding to the feature combinations, the feature value sets including feature values of combined features.

In the embodiments of this application, the combined feature is obtained by performing feature combination on the original features based on the corresponding feature combination. The feature value of the combined feature may be extracted based on historical log data, or may be a part of historical log data obtained by sampling the historical log data.

In an actual application, sometimes the combined feature is more important than a single original feature. For example, as an independent original feature, the content tag is not an important feature because there may be a large quantity of users willing to browse content corresponding to each tag. However, for a specific user, the user may be only interested in content including some specific keywords. Therefore, a combined feature obtained by combining the user ID and the content tag is a very important feature. For example, a user David likes to browse content related to basketball, the accuracy of predicting a CTR by using a sample with a value of a combined feature as "David-basketball" obtained by using a feature combination "user ID-content tag" is greatly higher than the accuracy of than predicting a CTR by using only a sample with a single original feature "basketball".

Generally, each original feature is not combined with the original feature. However, when an original feature includes a plurality of values, the original feature may be combined with the original feature itself. Therefore, a single original feature (that is, a feature not combined with another original feature) may also be regarded as a special combined feature (that is, a feature obtained by "combining" multiple feature values of only one original feature). For example, when the original feature is "media followed by the user", a combined feature "media followed by the user-media followed by the user" may be constructed. For a specific sample in which the media followed by the user is media A and media B, a feature value of a combined feature constructing in the foregoing manner may be "media A-media A", "media A-media B", and "media B-media B".

Step 503: Determine weight values corresponding to the combined features based on the feature values of the combined features in the corresponding feature value sets.

In some embodiments, the server may determine the weight values of the combined features by using the following method: inputting the feature values of the combined features into a weight calculation model, to obtain the weight values corresponding to the combined features outputted by the weight calculation model. In other words, in this embodiment of this application, the feature values of the combined features may be respectively inputted into a pre-trained weight calculation model to obtain the weight values corresponding to the combined features.

In some embodiments, the server may train the weight calculation model in the following method: inputting feature value samples marked with target weight values into the weight calculation model to obtain weight values that are outputted by the weight calculation model and correspond to the feature value sample; determining a value of a loss function of the weight calculation model based on the outputted weight values and the target weight values; and updating a model parameter of the weight calculation model based on the value of the loss function.

In an actual application, the weight calculation model may be pre-constructed based on a deep learning method. For example, a convolutional neural network model that is used for calculating weight values and includes an input layer, a hidden layer, and an output layer is configured to calculate the weight values of the combined features to obtain the weight calculation model. The weight calculation model is trained based on acquired feature value samples after the construction of the weight calculation model is completed, to obtain an optimized parameter of the weight calculation model. In actual implementation, during the training of the weight calculation model, the inputted feature value samples may be samples only of a specific feature combination, or may be samples of all the feature combinations. Generally, to accelerate the model training, training may be performed by using only samples of a specific feature combination.

In actual implementation, the server may obtain the weight values corresponding to the feature value samples by using the following method: first, acquiring a large quantity of feature value samples, such feature value samples being obtained by sampling historical log data related to some to-be-recommended content, the feature value samples respectively being marked with corresponding target weight values; and then dividing the large quantity of acquired samples into a training set and a test set according to a specific proportion before training, and inputting the feature value samples marked with the target weight values in the training set into the weight calculation model, to obtain weight values that are outputted by the weight calculation model and correspond to the feature value samples. Further, a process of the model training is a process of updating and adjusting parameters of the model, and training sample data is inputted into the input layer of the weight calculation model and finally reaches the output layer after passing through the hidden layer, and a result is outputted. Because there may be an error between an output result of the weight calculation model and an actual result, the error between the output result and the actual result needs to be calculated, and the error is back-propagated from the output layer to the hidden layer until the error is propagated to the input layer, and a value of the model parameter is further adjusted according to the error in the back-propagation process. The entire training process is continuously iterated until convergence is achieved, to reduce an error of an output of the model.

In view of this, in the embodiments of this application, to reduce a possible error between the weight value outputted by the weight calculation model and the target weight value, a loss function is introduced. A value of the loss function may be determined based on the weight values of the feature value samples outputted by the weight calculation model and the target weight value. A back-propagation algorithm is used for updating the parameter of the weight calculation model layer by layer based on the value of the loss function until the loss function converges, so that the parameter of the weight calculation model is constrained and adjusted to obtain a weight calculation model with high calculation precision and determine the weight values of the combined features based on the weight calculation model.

In an actual application, when the weight values of the combined features are determined based on the weight calculation model, the weight values of the combined features may be obtained by optimizing the following function:

$$\min \Sigma_i \, loss(y'^{(i)}, \hat{y}'^{(i)}) \qquad (1); \text{ where}$$

$y'^{(i)}$ represents a CTR (a real number between 0 and 1) predicted based on the weight values of the combined features, $y^{(i)}$ represents a click result indicating whether the user clicks or not (which is 1 if the user clicks, or is 0 if the user does not click), and loss is a target function. In an actual application, after the feature value samples marked with the target weight values in the training set are inputted into the weight calculation model to obtain the weight values that are outputted by the weight calculation model and correspond to the feature value samples, for each sample in the test set, weight values corresponding to feature values of all combined features of the sample in a feature combination, i.e., F are added to obtain a predicted sample score, that is, a predicted score of the feature combination. For example, the score corresponding to the feature combination may be predicted in the following manner: $\hat{z}'^{(i)} = \Sigma_{j \in x_F{}^{(i)}} w_{F,j}$, where $w_{F,j}$ represents the weight value of the combined feature; F represents the feature combination; j represents the feature value corresponding to the combined feature in the feature combination F; $j \in x_F{}^{(i)}$ represents that a value of the $i^{th}$ sample in the feature combination F includes the combined feature j; and $\hat{z}'^{(i)}$ represents the predicted score of the feature combination. Next, a predicted CTR may be calculated in the following manner: $\hat{y}'^{(i)} = 1/[1 + \exp(-\hat{z}'^{(i)})]$.

Common target functions include a square loss function, a log loss function, and the like. During prediction of the CTR, the most commonly used target function is the log loss function, whose form is as follows:

$$\min -\Sigma_i y^{(i)} \log \hat{y}'^{(i)} + (1 - y^{(i)})\log(1 - \hat{y}'^{(i)}) \qquad (2).$$

In an actual application, all positive samples meet $y^{(i)} = 1$, and all negative samples meet $y^{(i)} = 0$. Therefore, the foregoing formula (2) may be transformed into the following form:

$$\min -[\Sigma_{i \in positive \, samples} \log \hat{y}'^{(i)} + \Sigma_{i \in negative \, sample} \log (1 - \hat{y}'^{(i)})] \qquad (3).$$

An optimal solution of a target function of the foregoing formula (3) generally cannot be expressed by an analytical expression. Therefore, an iterative method such as an SGD method is generally used in the solution to obtain the weight values of the combined features, resulting in a lot of time consumed in the model training. However, in feature engineering, effectivenesses of a large quantity of feature combinations need to be assessed, the model training method has high calculation costs and a low speed.

To avoid the time-consuming model training, the embodiments of this application further provide a solution of determining the weight values of the combined features by using a statistical method, to speed up the calculation of the weight values, thereby ensuring that the efficiency of assessing effectivenesses of a large quantity of feature combinations can be improved. The statistics method used for determining the weight values of the combined features is described below.

In some embodiments, the server may determine the weight values of the combined features by using the following method: determining a positive sample statistic corresponding to each feature value of the combined feature and a negative sample statistic corresponding to the feature value of the combined feature; and obtaining the weight values corresponding to the combined features based on the positive sample statistics and the negative sample statistics corresponding to the feature values.

In this embodiment of this application, a positive sample represents sample data corresponding to clicked content among a plurality of pieces of displayed to-be-recommended content during display of the to-be-recommended content; and a negative sample represents sample data corresponding to clicked content among a plurality of pieces of displayed to-be-recommended content during display of the to-be-recommended content.

In other words, in this embodiment of this application, all samples corresponding to the acquired feature value sets are divided into positive samples and negative samples according to click states of the to-be-recommended content Exemplarily, when the feature combination is "user ID-product type", feature values of combined features corresponding to the feature combination "user ID-product type" may include "David-cosmetics, David-Snacks, David-clothing, and David-sports shoes". When content recommendation is performed based on the feature values, "cosmetics, snacks, clothing, and sports shoes" are recommended to "David". If "David" clicks on "cosmetics and snacks", and does not click on the others, "David-cosmetics and David-snacks" are positive samples, and "David-clothing and David-sports shoes" are negative samples.

In an actual application, during determining of the weight value of the combined feature, only some statistics of feature value samples of the combined feature need to be considered. Therefore, the target function of formula (3) may be transferred into the following form:

$$
\min - \left[ \sum_{i \in \, positive\, samples\, including\, feature\, j} \log \frac{1}{1 + e^{-w_{F,j}}} + \sum_{i \in \, negative\, samples\, including\, feature\, j} \log \frac{1}{1 + e^{w_{F,j}}} \right],
$$

$(4)$ where an analytical solution of the target function is the weight value of the combined feature.

In some embodiments, in a simplest case in which the combined feature only includes one feature value, the server may determine a positive sample statistic including the feature value as a positive sample statistic corresponding to the feature value, and determine a negative sample statistic including the feature value as a negative sample statistic corresponding to the feature value.

After the positive sample statistic corresponding to the feature value and the negative sample statistic corresponding to the feature value are determined, the weight value corresponding to the combined feature is determined based on the positive sample statistic and the negative sample statistic. In actual implementation, the weight values corresponding to the combined features may be calculated based on the positive sample statistics and the negative sample statistics corresponding to the feature values by using the following formula:

$$
w_{F,j} = \log \frac{N_j^+}{N_j^-};
$$

$(5)$ where $w_{F,j}$ is the weight value of the combined feature; F is the feature combination; j is the feature value corresponding to the combined feature in the feature combination F; $N_j^+$ is the positive sample statistic corresponding to the feature value j; and $N_j^-$ is the negative sample statistic corresponding to the feature value j.

In an actual application, for the case in which the combined feature only includes one feature value, the positive sample statistic corresponding to the feature value and the negative sample statistic corresponding to the feature value may be calculated by using the following formulas:

$N_j^+$=positive sample statistic corresponding to feature value $j$ $(6)$; and $N_j^-$=negative sample statistic corresponding to feature value $j$ $(7)$.

With reference to formula (5) to formula (7), it can be learned that a larger quantity of positive samples including a feature value j indicates a larger weight value of the combined feature; and on the contrary, a larger quantity of negative samples including the feature value j indicates a smaller weight value of the combined feature. In some embodiments, when the positive sample statistic corresponding to the feature value j is greater than the negative sample statistic corresponding to the feature value j, $w_{F,j} > 0$, which indicates that a contribution of the combined feature to CTR prediction is positive; otherwise, the contribution is negative.

Based on the foregoing method, the weight value corresponding to the combined feature can be calculated by using formula (5) as soon as $N_j^+$ and $N_j^-$ corresponding to each feature value are calculated, which is relatively simple and convenient, and is also an advantage of the statistical method compared with the weight calculation model training method.

Only the simplest case is considered in the foregoing embodiment. However, other different cases may occur in an engineering application. Therefore, the foregoing embodiment needs to be improved according to actual conditions. An improved method for calculating a statistic in different scenarios is described below.

In some embodiments, for a specific feature combination, when there are a plurality of feature values of a combined feature in a sample, the server may determine a positive sample statistic corresponding to each of the feature values of the combined feature and a negative sample statistic corresponding to the feature value of the combined feature by using the following method: determining a feature value statistic of the combined feature in positive samples including the feature value, and a feature value statistic of the combined feature in negative samples including the feature value; determining a positive sample statistic corresponding to the feature value based on the feature value statistic of the combined feature in the positive samples including the feature value; and determining a negative sample statistic corresponding to the feature value based on the feature value statistic of the combined feature in the negative samples including the feature value.

In an actual application, for a specific feature combination (such as "user ID-content tag"), there may be a plurality of feature values of a combined feature in a sample. For example, when David watched a specific variety show in which a specific basketball star participates, content tags of the sample include "specific basketball star" and "specific variety show". In addition, feature values of combined features corresponding to the sample "user ID-content tag" may include "David-basketball star" and "David-specific variety show", and a click behavior of David may be performed based on one of the two feature values. Therefore, a contribution of the sample to "David-basketball star" is to be less than that of a sample only including the feature value "David-basketball star" (for example, in another sample, David watched an individual interview of the basketball star).

To resolve the problem, in this embodiment of this application, $N_j^+$ and $N_j^-$ may be calculated by using the following formulas:

$$N_j^+ = \sum_{\text{positive samples including feature } j} \frac{1}{\text{quantity of feature values of a combined feature of the sample}}; \quad (8)$$

and $$N_j^- = \sum_{\text{negative samples including feature } j} \frac{1}{\text{quantity of feature values of a combined feature of the sample}}. \quad (9)$$

Next, the weight value $w_{F,j}$ corresponding to the combined feature is calculated by using the foregoing formula (5). In this embodiment, a larger quantity of feature values of a sample indicates a smaller contribution of the sample to a weight of a specific feature value j. The reason is that the sample is a positive sample or a negative sample may be determined according to other feature values rather than the feature value j. In an actual application, because most of features in the recommendation system are sparse, a specific feature may appear only a few times in training samples. For example, if "content ID" appears only once in a specific piece of content of the training samples and is clicked, "content ID" may be considered as a positive sample. In this case, a weight value $w_{F,j}$ of a corresponding combined feature calculated according to formula (5) is positive infinity (which means the recommendation system determines that a CTR of the content is 100%), which is an unreasonable result.

To resolve such a problem, formula (4) may be transferred into the following form:

$$\min -\left[ \sum_{i \in \text{ positive samples including feature } j} \log\frac{1}{1 + e^{-w_{F,j}}} + \sum_{i \in \text{ negative samples including feature } j} \log\frac{1}{1 + e^{w_{F,j}}} \right] + \lambda_1 |w_{F,j}| + \frac{1}{2}\lambda_2 w_{F,j}^2. \quad (10)$$

where $\lambda_1$ and $\lambda_2$ are non-negative real numbers. Compared with formula (4), two terms are added to formula (10), i.e., $\lambda_1|W_{F,j}|$ and $\frac{1}{2}\lambda_2 W_{F,j}^2$, which are referred to as regularization terms. The newly added two terms play a leading role when a quantity of samples becomes smaller, so that the weight value of the combined feature tends to be closer to 0; and original terms of the target function play a leading role when the quantity of samples becomes larger, so that the weight value of the combined feature tends to be closer to the weight value calculated according to formula (5).

There is no analytical solution for formula (10). Therefore, in some embodiments, for a sample with few values, the server may obtain the weight values corresponding to the combined features based on the positive sample statistics and the negative sample statistics corresponding to the feature values by using the following method: determining the weight value of the combined feature as 0 when $|N'w_{F,j}^0|$ is less than $\lambda_1$; determining the weight value of the combined feature as a ratio of a difference to a first sum when $N'w_{F,j}^0$ is greater than $\lambda_1$, the difference being a difference between $N'w_{F,j}^0$ and $\lambda_1$, and the first sum being a sum of N' and $\lambda_2$; and determining the weight value of the combined feature as a ratio of a second sum to the first sum when $N'w_{F,j}^0$ is less than $-\lambda_1$, the second sum being a sum of $N'w_{F,j}^0$ and $\lambda_1$.

Both $\lambda_1$ and $\lambda_2$ are non-negative real numbers; and N' is obtained according to a ratio of a product to a third sum. The product is a product of the positive sample statistic corresponding to the feature value and the negative sample statistic corresponding to the feature value. The third sum is a sum of the positive sample statistic corresponding to the feature value and the negative sample statistic corresponding to the feature value. $w_{F,j}^0$ is obtained according to a ratio of the positive sample statistic corresponding to the feature value to the negative sample statistic corresponding to the feature value.

For example, in this embodiment of this application, the weight value $w_{F,j}$ corresponding to the combined feature is approximately calculated by using the following method to replace formula (5):

$$w_{F,j} = \begin{cases} 0, & |N'w_{F,j}^0| < \lambda_1 \\ \dfrac{N'w_{F,j}^0 - \lambda_1}{N' + \lambda_2}, & N'w_{F,j}^0 > \lambda_1 \\ \dfrac{N'w_{F,j}^0 + \lambda_1}{N' + \lambda_2}, & N'w_{F,j}^0 1 < -\lambda_1 \end{cases} \quad (11)$$

$$\text{where } w_{F,j}^0 = \log\frac{N_j^+}{N_j^-}, \quad N' = \frac{N_j^+ N_j^-}{N_j^+ + N_j^-},$$

F is the feature combination; j is the feature value corresponding to the combined feature in the feature combination F; $N_j^+$ is the positive sample statistic corresponding to the feature value j; and $N_j^-$ is the negative sample statistic corresponding to the feature value j.

In a case that a quantity of positive samples or negative samples is relatively small, N' is also relatively small, and $|N'w_{F,j}^0|<\lambda_1$, then $w_{F,j}$ becomes 0 according to formula (11). $w_{F,j}$ becomes a non-zero value as the quantity of samples continues to increase. However, the existence of $\lambda_1$ and $\lambda_2$ may reduce an absolute value of $w_{F,j}$, that is, reduce the impact of $w_{F,j}$ on assessing the effectiveness of the feature combination, and $w_{F,j}$ approaches $w_{F,j}$ only when the quantity of samples is sufficiently large, which indicates that obtained statistical data of the samples can be fully trusted in this case.

In some embodiments, in a case in which the prediction precision of CTR prediction model for a specific feature is not high, the server may determine the positive sample statistic corresponding to each feature value of the combined feature and the negative sample statistic corresponding to the feature value of the combined feature by using the following method: determining a corresponding first prediction precision when positive samples including the feature value are training samples and a corresponding second prediction precision when negative samples including the feature value are training samples; determining the positive sample statistic corresponding to the feature value based on the first prediction precision; and determining the negative sample statistic corresponding to the feature value based on the second prediction precision.

Herein, the first prediction precision represents an accuracy of performing recommendation based on the positive samples of the feature value, and the second prediction precision represents an accuracy of performing recommendation based on the negative samples of the feature value.

In an actual application, the importance of a specific combined feature obtained based on a feature combination needs to be assessed based on an existing CTR prediction model, that is, how much supplementary effect an added combined feature has on the CTR prediction model. The following cases may occur when the positive sample statistic and the negative sample statistic corresponding to the feature value of the combined feature are determined according to the foregoing embodiments: a relatively high feature effectiveness is calculated, but there are other features that may achieve a similar effect in the CTR prediction model. As a result, inputting the feature into the CTR prediction model may not significantly improve the prediction precision of the CTR prediction model.

For example, when a CTR predicted by the CTR prediction model for each sample is known, the target function shown in formula (4) may be adjusted into the following form to consider the impact of the CTR prediction model:

$$\min - \left[ \sum_{i \in positive\ samples\ including\ feature\ j} \log \frac{1}{1 + e^{-\left(\hat{z}^{(i)} + w_{F,j}\right)}} + \sum_{i \in negative\ samples\ including\ feature\ j} \log \frac{1}{1 + e^{\hat{z}^{(i)} + w_{F,j}}} \right], \qquad (12)$$

$$\text{where } \hat{z}^{(i)} \text{ meets } \hat{y}^{(i)} = 1 / \left[ 1 + \exp\left(-\hat{z}^{(i)}\right) \right]$$

and is used for representing a score of the sample obtained based on the CTR prediction model, and if $\hat{z}^{(i)} > 0$, it indicates that a CTR of the user outputted by the CTR prediction model is greater than 50%; otherwise, the CTR of the user outputted by the CTR prediction model is less than 50%.

There is no analytical solution for the foregoing target function (12). The following formula is used for modifying the positive sample statistic and the negative sample statistic corresponding to the feature value in this embodiment of this application:

$$N_j^+ = \Sigma_{i \in positive\ samples\ including\ feature\ j} (1 - \hat{y}^{(i)}) \qquad (13);\ and$$

$$N_j^- = \Sigma_{i \in negative\ samples\ including\ feature\ j} \hat{y}(i) \qquad (14).$$

Next, the weight value $w_{F,j}$ corresponding to the combined feature may be calculated by using formula (5). In this embodiment, for a positive sample, the more inaccurately the CTR prediction model predicts, the more the sample needs to be considered; and for a negative sample, the more inaccurately the CTR prediction model predicts, the more the sample needs to be considered.

In some embodiments, in an engineering application, in a case in which a training set of samples is too large, the server may determine the positive sample statistic corresponding to each feature value of the combined feature and the negative sample statistic corresponding to the feature value of the combined feature by using the following method: determining weight values of first sampling samples and weight values of second sampling samples; determining the positive sample statistic corresponding to the feature value based on the weight values of the first sampling samples; and determining the negative sample statistic corresponding to the feature value based on the weight values of the second sampling samples.

The first sampling samples represent samples selected from positive samples including the feature value in a first proportion, and the second sampling samples represent samples selected from negative samples including the feature value in a second proportion.

In an actual application, data in the engineering application may reach in an order of Terabyte (TB) or even Petabyte (PB). Although effectiveness of a feature combination may be assessed according to simple statistics in the foregoing embodiments, such assessment is still impractical when an amount of data of the feature combination is too large. Therefore, in the embodiments of this application, a sampling method is used for determining a positive sample statistic and a negative sample statistic corresponding to a feature value when there is a relatively large quantity of samples in a training set. In this case, calculation formulas of $Nj^+$ and $Nj^-$ are as follows:

$$N_j^+ = \frac{1}{\alpha\%} \sum_{selected\ a\%\ of\ positive\ samples\ including\ feature\ j} weight\ of\ sample; \qquad (15)$$

and $$N_j^- = \frac{1}{\beta\%} \sum_{selected\ \beta\%\ of\ negative\ samples\ including\ feature\ j} weight\ of\ sample. \qquad (16)$$

Then the corresponding weight value $w_{F,j}$ of the combined feature is calculated by using formula (5). $\alpha\%$ of samples are randomly selected from positive samples including a feature j and $\beta\%$ of samples are randomly selected from negative samples including a feature j when there is a relatively large quantity of samples in the training set, $N_j^+$ and $N_j^-$ may be calculated by using formulas (15) and (16). $\alpha\%$ and $\beta\%$ may be set according to actual conditions, which are not limited herein. The weight of the sample is different in different solutions above. In formulas (6) and (7), the weight of the sample is 1; and in formulas (8), (9), (13), and (14), the weight of the sample is a value of a corresponding formula in a sum operator.

In some other cases, the server may determine a positive sample statistic corresponding to feature values of combined feature and a negative sample statistic corresponding to feature values of combined feature by using the following method: determining weight values of positive samples including the feature value in a first part of samples and weight values of first sampling samples in a second part of samples; determining weight values of negative samples including the feature values in the first part of samples and weight values of second sampling samples in the second part of samples; determining the positive sample statistic corresponding to the feature value based on the weight values of the positive samples including the feature value in the first part of samples and the weight values of the first sampling samples in the second part of samples; and determining the negative sample statistic corresponding to the feature value based on the weight values of the negative samples including the feature value in the first part of samples and the weight values of the second sampling samples in the second part of samples.

The first sampling samples represent samples in a first proportion selected from positive samples that belong to the second part of samples and include the feature value, and the second sampling samples represent samples in a second proportion selected from negative samples that belong to the second part of samples and include the feature value.

Specifically, in an actual application, prediction may be performed by using a method of partial sampling. The partial sampling is to classify whole samples into two parts, i.e., part A and part B. All samples in part A are involved in the statistics, and samples in part B are sampled.

In this way, samples of greater importance (i.e., a part of samples with an extremely large deviation of prediction of the CTR prediction model) may be classified into part A to ensure that the part of samples are fully considered, and samples of less importance are classified into part B for sampling, to reduce the calculation amount. In this case, $N_j^+$ and $N_j^-$ may be calculated in the following manner:

$$N_j^+ = \sum_{\substack{positive\ samples\ including\ feature\ j\ in\ part\ A}} weight\ of\ sample + \frac{1}{\alpha\%} \tag{17}$$

$$\sum_{\substack{selected\ \alpha\%\ of\ positive\ samples\ including\ feature\ j\ from\ part\ B}} weight\ of\ sample;\ and$$

$$N_j^- = \sum_{\substack{negative\ samples\ including\ feature\ j\ in\ part\ A}} weight\ of\ sample + \frac{1}{\beta\%} \tag{18}$$

$$\sum_{\substack{selected\ \beta\%\ of\ negative\ samples\ including\ feature\ j\ from\ part\ B}} weight\ of\ sample.$$

Next, the weight value $w_{F,j}$ corresponding to the combined feature may be calculated by using formula (5).

Four optimized solutions in different directions are provided in the foregoing embodiments to determine the positive sample statistic corresponding to each feature value of the combined feature and the negative sample statistic corresponding to the feature value of the combined feature. There is no contradiction between the solutions, and such solutions may be combined with each other.

For example, a description is made by using an example in which a solution for improving a case that each combined feature in each sample corresponds to a plurality of feature values is combined with a solution for improving a case that the prediction precision of a CTR prediction model for a specific feature is not high.

The foregoing solution for improving a case that each combined feature in each sample corresponds to a plurality of feature values and the solution for improving a case that the prediction precision of a CTR prediction model for a specific feature is not high are implemented by adjusting $N_j^+$ and $N_j^-$ that is, adjusting a weight of each sample in a sum operator, and corresponding sample weights may be multiplied during combination of the two solutions. $N_j^+$ and $N_j^-$ may be calculated by using the following formulas:

$$N_j^+ = \sum_{\substack{i\in\ positive\ samples\ including\ feature\ j}} \frac{\left(1 - \hat{y}^{(i)}\right)}{\substack{quantity\ of\ feature\ values\\ of\ combined\ feature\ F\ of\ the\ sample}}; \tag{19}$$

and $$N_j^- = \sum_{\substack{i\in\ negative\ samples\ including\ feature\ j}} \frac{\hat{y}^{(i)}}{\substack{quantity\ of\ feature\ values\\ of\ combined\ feature\ F\\ of\ the\ sample}}. \tag{20}$$

Step 504: Construct weight value sets corresponding to the feature combinations based on the weight values of the combined features.

The weight value sets of the feature combinations include the weight values corresponding the combined features, and the combined feature may be obtained by performing feature combination on the original features based on the corresponding feature combination.

Step 505: Respectively determine effectivenesses of the feature combinations based on the weight value sets of the feature combinations.

In this embodiment of this application, the effectiveness of the feature combination is used for predicting an accuracy of performing content recommendation according to features obtained based on the corresponding feature combination.

In some embodiments, the server may determine the effectiveness of the feature combination by using the following method: weighting weight values of all combined features in the weight value set, to obtain a score corresponding to each of the feature combinations; and respectively determining the effectivenesses of the feature combinations based on the scores of the feature combinations;

The server may respectively determine the effectivenesses of the feature combinations based on the scores of the feature combinations by using the following method: comparing the scores of the feature combinations with a target score, to obtain comparison results respectively corresponding to the feature combinations; and determining the effectivenesses corresponding to the feature combinations based on the comparison results.

The effectiveness corresponding to the feature combination is calculated after the weight value set corresponding to each feature combination is determined. In an actual application, weight values in the weight value set may be weighted to obtain the score corresponding to the feature combination. The scores of the feature combinations are compared with the corresponding target score to obtain comparison results, so that the effectivenesses corresponding to the feature combinations can be determined based on the comparison results. It can be learned that, by applying the foregoing embodiments, the effectiveness of each feature combination is calculated, so that a target feature combination can be selected according to the effectivenesses of the feature combinations.

In actual implementation, the comparison result between the score of the feature combination and the target score may be calculated according to an area under curve (AUC) surrounded by a ROC curve and coordinate axes, log loss, and other precision indicators, to determine the effectiveness of the feature combination. The score of the feature combination is used for representing a possibility that the to-be-recommended content is clicked by a user during recommendation according to combined features obtained based on the corresponding feature combination.

In some embodiments, the feature effectiveness assessment method further includes: selecting a target quantity of feature combinations from the feature combination set as target feature combinations based on ranking of the effectivenesses of the feature combinations after the effectivenesses of the feature combinations are determined; and performing feature combination on the original features based on the target feature combinations to obtain target combined features, so as to perform content recommendation based on the target combined features.

In other words, in this embodiment of this application, after the effectivenesses of the feature combinations are determined, the feature combinations are ranked in a descending order according to the effectivenesses of the feature combinations, and a plurality of feature combinations in the feature combination set are selected to obtain a target quantity of feature combinations with high effectivenesses as the target feature combinations, so as to perform feature combination based on the determined target feature combinations to obtain the target combined features used for content recommendation.

In actual implementation, the target quantity may be preset, and the target quantity of feature combinations ranking in the top are used as the target feature combinations. For example, the target quantity is set to 30, and top 30 feature combinations in the ranking are determined as the target feature combinations. Certainly, an effectiveness threshold may also be preset. The effectivenesses of the feature combinations are compared with the effectiveness threshold, and feature combinations whose effectivenesses reach the effectiveness threshold are used as the target feature combinations.

In some other embodiments, the feature effectiveness assessment method further includes: selecting a target quantity of feature combinations from the feature combination set as first candidate feature combinations based on ranking of the effectivenesses of the feature combinations after the effectivenesses of the feature combinations are determined; generating a plurality of second candidate feature combinations based on the first candidate feature combinations and the original features; selecting a feature combination meeting a selecting condition from the plurality of second candidate feature combinations as a target feature combination; and performing feature combination on the original features based on the target feature combinations to obtain target combined features, so as to perform content recommendation based on the target combined features.

To further select more effective feature combinations, in the embodiments of this application, the first candidate feature combinations are increased after the first candidate feature combinations are selected, so that more feature combinations are obtained as the second candidate feature combinations.

In some embodiments, the server may generate the plurality of second candidate feature combinations by using the following method: combining the original features based on the first candidate feature combinations to obtain the combined features; determining a plurality of feature combinations obtained by combining the combined features and at least one original feature; and generating the plurality of second candidate feature combinations based on the plurality of feature combinations and the first candidate feature combinations. It can be learned that, in this embodiment of this application, more second candidate feature combinations are generated based on the first candidate feature combinations and the original features, thereby improving the diversity of the feature combinations to obtain more effective feature combinations, and improving the accuracy of content recommendation.

After the target feature combination is obtained, the obtained original features can be combined based on the target feature combination, to obtain the target combined feature. There may be a plurality of target feature combinations. The foregoing original features may be combined based on the target feature combinations, or may be combined based on a target feature combination with the highest effectiveness, to obtain the target combined feature and recommend the foregoing to-be-recommended content based on the target combined feature.

In some embodiments, the server may perform content recommendation based on the target combined feature by using the following method: inputting the target combined feature as an input feature into a CTR prediction model, to obtain a CTR of a target user on the to-be-recommended content; selecting a target quantity of pieces of content from the to-be-recommended content as target recommendation content based on the CTR; and returning the target recommendation content to the target user.

Through the technical solutions provided in the embodiments of this application, for a given feature combination set including a plurality of feature combinations, feature value sets respectively corresponding to the feature combinations are obtained, the feature value sets herein including feature values of combined features; weight values corresponding to the combined features are determined based on the feature values of the combined features; and weight value sets corresponding to the feature combinations are constructed based on the weight values of the combined features. In this way, effectivenesses of the feature combinations can be determined based on the weight value sets of the feature combinations, and effectivenesses of a large quantity of feature combinations can be assessed in a short time without performing time-consuming experiments and model training, thereby improving the efficiency of assessing the effectivenesses of the large quantity of feature combinations, and improving the recommendation effect of a recommendation system.

Figure 6:
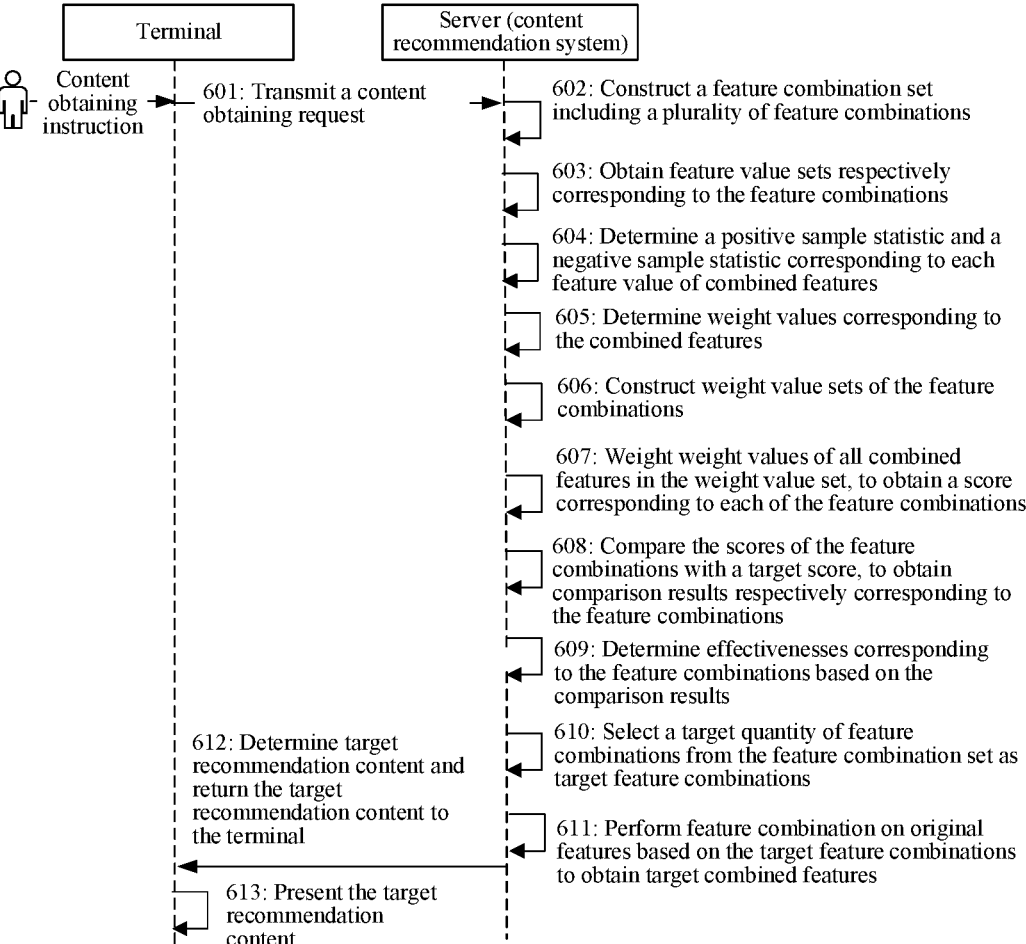
FIG. 6 is a schematic flowchart of a feature effectiveness assessment method according to an embodiment of this application.

The following describes an exemplary application of the embodiments of this application in an actual application scenario. FIG. 6 is a schematic flowchart of a feature effectiveness assessment method according to an embodiment of this application. In some embodiments, the feature effectiveness assessment method may be implemented by a terminal or a server, or may be implemented by a server and a terminal in cooperation.

The implementation of the feature effectiveness assessment method provided in the embodiments of this application is described below with reference to steps shown in FIG. 6 by using an example in which the method is implemented by the server and the terminal in cooperation, for example, the method is implemented by the terminal 100-1 and the server 300 in cooperation shown in FIG. 1. For details not described in the following steps, reference may be made to the foregoing description. The feature effectiveness assessment method provided in the embodiments of this application may include the following steps:

Step 601: A terminal transmits a content obtaining request to a server.

A user corresponding to the terminal triggers the content obtaining instruction by using an interface of the terminal, and the terminal generates a content obtaining request in response to the content obtaining instruction and transmits the content obtaining request to the server.

Step 602: The server constructs a feature combination set including a plurality of feature combinations after receiving the content obtaining request.

The feature combination herein is a combination of original features of to-be-recommended content. During construction pf the feature combination set, a plurality of original features may be obtained, that is, original features related to the user or the to-be-recommended content, such as "user ID and content tag". The obtained plurality of original features are combined in pairs to generate a plurality of feature combinations, so that the feature combination set is constructed according to the obtained plurality of original features and the plurality of feature combinations.

In actual implementation, more than two original features may be selected for combination to generate the plurality of feature combinations.

Step 603: The server obtains feature value sets respectively corresponding to the feature combinations.

The feature value sets include feature values of combined features, and the combined feature may be obtained by performing feature combination on the original features based on the corresponding feature combination. The feature value of the combined feature may be extracted based on historical log data, or may be a part of historical log data obtained by sampling the historical log data.

Step 604: The server determines a positive sample statistic corresponding to each feature value of the combined feature and a negative sample statistic corresponding to the feature value of the combined feature.

The positive sample represents sample data corresponding to clicked content among a plurality of pieces of displayed to-be-recommended content during display of the to-be-recommended content, and the negative sample represents sample data corresponding to unclicked content among the plurality of pieces of displayed to-be-recommended content during display of the to-be-recommended content.

Step 605: The server obtains weight values corresponding to the combined features based on the positive sample statistics and the negative sample statistics corresponding to the feature values.

In some embodiments, the server may determine the weight values of the combined features by using the weight calculation model. In actual implementation, the feature values of the combined features are inputted into the weight calculation model, to obtain the weight values that are outputted by the weight calculation model and correspond to the combined features.

Step 606: The server constructs weight value sets corresponding to the feature combinations based on the weight values of the combined features.

The weight value sets of the feature combinations include the weight values corresponding the combined features, and the combined feature may be obtained by performing feature combination on the original features based on the corresponding feature combination.

Step 607: The server weights weight values of all combined features in the weight value set, to obtain a score corresponding to each of the feature combinations.

The score of the feature combination is used for representing a possibility that the to-be-recommended content is clicked by a user during content recommendation according to combined features obtained based on the corresponding feature combination.

Step 608: The server compares the scores of the feature combinations with a target score, to obtain comparison results respectively corresponding to the feature combinations.

The comparison result between the score of the feature combination and the target score may be calculated according to precision indicators such as AUC and log loss.

Step 609: The server determines effectivenesses corresponding to the feature combinations based on the comparison results.

The effectiveness of the feature combination is used for predicting an accuracy of performing content recommendation according to features obtained based on the corresponding feature combination.

Step 610: The server selects a target quantity of feature combinations from the feature combination set as target feature combinations based on ranking of the effectivenesses of the feature combinations.

The server may further select a target quantity of feature combinations from the feature combination set as first candidate feature combinations based on the ranking of the effectivenesses of the feature combinations after the effectivenesses of the feature combinations are determined; generate a plurality of second candidate feature combinations based on the first candidate feature combinations and the original features; select a feature combination meeting a selecting condition from the plurality of second candidate feature combinations as a target feature combination.

Step 611: The server performs feature combination on the original features based on the target feature combination to obtain a target combined feature.

Step 612: The server determines target recommendation content based on the target combined feature, and returns the target recommendation content to the terminal.

The server may determine the target recommendation content based on the target combined feature by using the following method: inputting the target combined feature as an input feature into the CTR prediction model, to obtain a CTR of a target user on the to-be-recommended content; and selecting a target quantity of pieces of content from the to-be-recommended content as the target recommendation content based on the CTR.

Step 603: The terminal presents the target recommendation content.

Through the technical solutions provided in the embodiments of this application, for a given feature combination set including a plurality of feature combinations, feature value sets respectively corresponding to the feature combinations are obtained, the feature value sets herein including feature values of combined features; weight values corresponding to the combined features are determined based on the feature values of the combined features; and weight value sets corresponding to the feature combinations are constructed based on the weight values of the combined features. In this way, effectivenesses of the feature combinations can be determined based on the weight value sets of the feature combinations, and effectivenesses of a large quantity of feature combinations can be assessed in a short time without performing time-consuming experiments and model training, thereby improving the efficiency of assessing the effectivenesses of the large quantity of feature combinations, and improving the recommendation effect of a recommendation system.

The feature effectiveness assessment method provided in the embodiments of this application may be applied to the following application scenarios:

In one usage scenario, a specific application (APP) builds a recommendation system from scratch, and predicts a CTR of a target user by using user ID, content ID, content tag, and city of user as used input features (original features of to-be-recommended content). Generally, it is difficult to predict a CTR for each of the original features. However, combined features obtained by combining the original features may provide effective information for the CTR. Through the feature effectiveness assessment method provided in the embodiments of this application, effectiveness assessment can be performed on all possible feature combinations (or some possible effective feature combinations such as "user ID-content tag" and "city of user-content tag" may be pre-selected based on the experience of practitioners), and the most effective feature combination (that is, a target feature combination such as "user ID-content tag") for predicting a CTR can be finally determined.

In another usage scenario, in a recommendation system of a news app, existing original features include user ID, content ID, content tag, and city of user. Currently, a new original feature "posting media" is added. How to combine the newly-added original feature and the existing original features to more effectively reflect the interests of a user is of vital importance. Possible feature combinations include "posting media-user ID", "posting media-content ID", "posting media-content tag", "posting media-city of user", "posting media-user ID-content tag", "posting media-city of user-content tag", or the like. Scores of the foregoing feature combinations can be determined through the feature effectiveness assessment method provided in the embodiments of this application, and a plurality of the most effective target feature combinations (for example, "posting media-city of user") are selected based on results of comparing the determined scores of the feature combinations with a target score and used for CTR prediction of the news APP.

In another usage scenario, a recommendation system of a specific APP has an automatic feature selection tool, which can select the most effective feature combinations from some original features such as user ID, content ID, content tag, city of user of to-be-recommended content. For such feature combinations, effectivenesses can be further assessed by using the feature effectiveness assessment method provided in the embodiments of this application, and a target quantity of the most effective target feature combinations are selected for CTR prediction of the APP.

The implementation of software of a feature effectiveness assessment apparatus 255 provided in the embodiments of this application are described below. Descriptions are made by using software modules included in the memory 250 of the electronic device 20 implementing the feature effectiveness assessment method provided in the foregoing embodiments of this application as an example, and for details not described in the following descriptions of the functions of the module, reference may be made to the foregoing description of the foregoing method embodiments of this application. As shown in FIG. 3, the feature effectiveness assessment apparatus 255 provided in the embodiments of this application may include:

a first constructing unit 2551, configured to construct a feature combination set including a plurality of feature combinations, the feature combination being a combination of original features of to-be-recommended content; an obtaining unit 2552, configured to obtain feature value sets respectively corresponding to the feature combinations, the feature value sets including feature values of combined features, and the combined feature being obtained by performing feature combination on the original features based on the corresponding feature combination; a first determining unit 2553, configured to determine weight values corresponding to the combined features based on the feature values of the combined features in the corresponding feature value sets; a second constructing unit 2554, configured to construct weight value sets corresponding to the feature combinations based on the weight values of the combined features; and a second determining unit 2555, configured to respectively determine effectivenesses of the feature combinations based on the weight value sets of the feature combinations, the effectiveness being used for predicting an accuracy of performing content recommendation according to features obtained based on the corresponding feature combination.

In some embodiments, the first determining unit includes:

a first determining subunit, configured to determine a positive sample statistic corresponding to each feature value of the combined feature and a negative sample statistic corresponding to the feature value of the combined feature; and a second determining subunit, configured to obtain the weight values corresponding to the combined features based on the positive sample statistics and the negative sample statistics corresponding to the feature values.

In some embodiments, that the first determining subunit determines the positive sample statistic corresponding to each feature value of the combined feature and the negative sample statistic corresponding to the feature value of the combined feature may be implemented by using the following method:

when the combined feature includes one feature value, determining a positive sample statistic including the feature value as a positive sample statistic corresponding to the feature value; and determining a negative sample statistic including the feature value as a negative sample statistic corresponding to the feature value.

In some other embodiments, that the first determining subunit determines the positive sample statistic corresponding to each feature value of the combined feature and the negative sample statistic corresponding to the feature value of the combined feature may be implemented by using the following method:

determining a feature value statistic of the combined feature in positive samples including the feature value, and a feature value statistic of the combined feature in negative samples including the feature value;

determining the positive sample statistic corresponding to the feature value based on the feature value statistic of the combined feature in the positive samples including the feature value; and determining the negative sample statistic corresponding to the feature value based on the feature value statistic of the combined feature in the negative samples including the feature value.

In some other embodiments, that the first determining subunit determines the positive sample statistic corresponding to each feature value of the combined feature and the negative sample statistic corresponding to the feature value of the combined feature may be implemented by using the following method:

determining a corresponding first prediction precision when positive samples including the feature value are training samples and a corresponding second prediction precision when negative samples including the feature value are training samples;

determining the positive sample statistic corresponding to the feature value based on the first prediction precision; and determining the negative sample statistic corresponding to the feature value based on the second prediction precision, the first prediction precision predicting an accuracy of performing recommendation based on the positive samples of the feature value; and the second prediction precision predicting an accuracy of performing recommendation based on the negative samples of the feature value.

In some other embodiments, that the first determining subunit determines the positive sample statistic corresponding to each feature value of the combined feature and the negative sample statistic corresponding to the feature value of the combined feature may be implemented by using the following method:

determining weight values of first sampling samples and weight values of second sampling samples, the first sampling samples representing samples in a first proportion selected from positive samples including the feature value, and the second sampling samples representing samples in a second proportion selected from negative samples including the feature value;

determining the positive sample statistic corresponding to the feature value based on the weight values of the first sampling samples; and determining the negative sample statistic corresponding to the feature value based on the weight values of the second sampling samples.

In some other embodiments, that the first determining subunit determines the positive sample statistic corresponding to each feature value of the combined feature and the negative sample statistic corresponding to the feature value of the combined feature may be implemented by using the following method:

determining weight values of positive samples including the feature value in a first part of samples and weight values of first sampling samples in a second part of samples, the first sampling samples representing samples in a first proportion selected from positive samples that belong to the second part of samples and include the feature value;

determining weight values of negative samples including the feature values in the first part of samples and weight values of second sampling samples in the second part of samples, the second sampling samples representing samples in a second proportion selected from negative samples that belong to the second part of samples and include the feature value;

determining the positive sample statistic corresponding to the feature value based on the weight values of the positive samples including the feature value in the first part of samples and the weight values of the first sampling samples in the second part of samples; and determining the negative sample statistic corresponding to the feature value based on the weight values of the negative samples including the feature value in the first part of samples and the weight values of the second sampling samples in the second part of samples.

In some embodiments, that the second determining subunit obtains the weight values corresponding to the combined features based on the positive sample statistics and the negative sample statistics corresponding to the feature values may be implemented by using the following method:

obtaining the weight values corresponding to the combined features based on the positive sample statistics and the negative sample statistics corresponding to the feature values by using the following formula:

$$w_{F,j} = \log \frac{N_j^+}{N_j^-};$$

where $w_{F,j}$ is the weight value of the combined feature; F is the feature combination; j is the feature value corresponding to the combined feature in the feature combination F; $N_j^+$ is the positive sample statistic corresponding to the feature value j; and $N_j^+$ is the negative sample statistic corresponding to the feature value j.

In some other embodiments, that the second determining subunit obtains the weight values corresponding to the combined features based on the positive sample statistics and the negative sample statistics corresponding to the feature values may be implemented by using the following method:

determining the weight value of the combined feature as 0 when $|N'w_{F,j}^0|$ is less than $\lambda_1$;

determining the weight value of the combined feature as a ratio of a difference to a first sum when $N'w_{F,j}^0$ is greater than $\lambda_1$, the difference being a difference between $N'w_{F,j}^0$ and $\lambda_1$, and the first sum being a sum of N' and $\lambda_2$; and determining the weight value of the combined feature as a ratio of a second sum to the first sum when $N'w_{F,j}^0$ is less than $-\lambda_1$, the second sum being a sum of $N'w_{F,j}^0$ and $\lambda_1$, Both $\lambda_1$ and $\lambda_2$ are non-negative real numbers; and N' is obtained according to a ratio of a product to a third sum. the product being a product of the positive sample statistic corresponding to the feature value and the negative sample statistic corresponding to the feature value; the third sum being a sum of the positive sample statistic corresponding to the feature value and the negative sample statistic corresponding to the feature value, and $w_{F,j}^0$ being obtained according to a ratio of the positive sample statistic corresponding to the feature value to the negative sample statistic corresponding to the feature value.

The positive sample represents sample data corresponding to clicked content among a plurality of pieces of displayed to-be-recommended content during display of the to-be-recommended content; and the negative sample represents sample data corresponding to unclicked content among the plurality of pieces of displayed to-be-recommended content during display of the to-be-recommended content.

In some embodiments, that the first determining unit determines the weight values corresponding to the combined features based on the feature values of the combined features in the corresponding feature value sets may be implemented by using the following method:

inputting the feature values of the combined features into a weight calculation model, to obtain the weight values of the combined features outputted by the weight calculation model.

In some embodiments, that the second determining unit respectively determines effectivenesses of the feature combinations based on the weight value sets of the feature combinations may be implemented by using the following method:

weighting weight values of all combined features in the weight value set, to obtain a score corresponding to each of the feature combinations; and respectively determining the effectivenesses of the feature combinations based on the scores of the feature combinations.

In some embodiments, that the second determining unit respectively determines the effectivenesses of the feature combinations based on the scores of the feature combinations may be implemented by using the following method:

comparing the scores of the feature combinations with a target score, to obtain comparison results respectively corresponding to the feature combinations; and determining the effectivenesses corresponding to the feature combinations based on the comparison results.

In some embodiments, the feature effectiveness assessment apparatus further includes:

a first selecting unit, configured to select a target quantity of feature combinations from the feature combination set as target feature combinations based on ranking of the effectivenesses of the feature combinations;

a feature combination unit, configured to perform feature combination on the original features based on the target feature combinations to obtain target combined features; and a content recommendation unit, configured to perform content recommendation based on the target combined features.

In some other embodiments, the feature effectiveness assessment apparatus further includes:

a second selecting unit, configured to select a target quantity of feature combinations from the feature combination set as first candidate feature combinations based on ranking of the effectivenesses of the feature combinations;

a generation unit, configured to generate a plurality of second candidate feature combinations based on the first candidate feature combinations and the original features;

a third selecting unit, configured to select a feature combination meeting a selecting condition from the plurality of second candidate feature combinations as a target feature combination;

a feature combination unit, configured to perform feature combination on the original features based on the target feature combination to obtain a target combined feature; and a content recommendation unit, configured to perform content recommendation based on the target combined feature.

In some embodiments, that the content recommendation unit recommends content based on the target combined feature may be implemented by using the following method:

inputting the target combined feature as an input feature into a click-through rate (CTR) prediction model, to obtain a CTR of a target user on the to-be-recommended content;

selecting a target quantity of pieces of content from the to-be-recommended content as target recommendation content based on the CTR; and returning the target recommendation content to the target user.

An embodiment of this application further provides an electronic device, including:

a memory, configured to store executable instructions; and a processor, configured to perform the foregoing feature effectiveness assessment method provided in the embodiments of this application when executing the executable instructions stored in the memory.

An embodiment of this application further provides a storage medium storing executable instructions, the executable instructions, when executed by a processor, configured to implement the feature effectiveness assessment method provided in the embodiments of this application.

In some embodiments, the storage medium, specifically, may be a computer read-only Memory (ROM), for example, a ferromagnetic random access memory (FRAM), a ROM, a PROM, an erasable programmable read-only memory (EPROM), an electrically erasable programmable read-only memory (EEPROM), a flash memory, a magnetic surface memory, an optical disc, or compact disc read-only memory (CD-ROM). or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

In conclusion, the technical solutions of the embodiments of this application have the following beneficial effects:

1) The effectivenesses of a large quantity of feature combinations can be quickly assessed in a short time without performing time-consuming experiments and model training, thereby improving the efficiency of assessing the effectivenesses of the large quantity of feature combinations.

2) The effectivenesses of the feature combinations are determined based on the weight value sets of the feature combinations with a high calculation speed. Therefore, practitioners may try more feature combinations as much as possible, to improve the performance of the recommendation system.

3) A developer may be helped to quickly and continuously add effective combined features to the recommendation system. The combined feature may be a target combined feature obtained based on a target feature combination determined according to the effectivenesses of the feature combinations, and content is recommended based on the target combined feature, thereby improving the recommendation effect of the recommendation system.

4) The solutions provided in the embodiments of this application have simple principles and are easy to implement, and have relatively strong engineering value, which improves the efficiency of feature engineering.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

INDUSTRIAL APPLICABILITY

In the embodiments of this application, an electronic device constructs a feature combination set including a plurality of feature combinations, the feature combination being a combination of original features of to-be-recommended content; obtains feature value sets respectively corresponding to the feature combinations, the feature value sets including feature values of combined features, and the combined feature being obtained by performing feature combination on the original features based on the corresponding feature combination; determines weight values corresponding to the combined features based on the feature values of the combined features in the corresponding feature value sets; constructs weight value sets corresponding to the feature combinations based on the weight values of the combined features; and respectively determines effectivenesses of the feature combinations based on the weight value sets of the feature combinations, the effectiveness being used for predicting an accuracy of performing content recommendation according to features obtained based on the corresponding feature combination. In this way, the effectivenesses of the feature combinations can be determined based on the weight value sets of the feature combinations, and effectivenesses of a large quantity of feature combinations can be assessed in a short time without performing time-consuming experiments and model training, thereby improving the efficiency of assessing the effectivenesses of the large quantity of feature combinations, and improving the recommendation effect of a recommendation system.

What is claimed is:

1. A method performed by an electronic device, the method comprising:

constructing a feature combination set comprising a plurality of feature combinations, each feature combination being a combination of original features of candidate recommendation content;

obtaining feature value sets each of which corresponds to a corresponding feature combination of the plurality of feature combinations, each feature value set comprising feature values of combined features based on the corresponding feature combination;

for each of the combined features, determining a positive sample statistic corresponding to each feature value of the combined feature and a negative sample statistic corresponding to the feature value of the combined feature, wherein the determining the positive sample statistic and the negative sample statistic comprises:

determining a corresponding first prediction accuracy when positive samples comprising the feature value are training samples and a corresponding second prediction accuracy when negative samples comprising the feature value are training samples, determining the positive sample statistic corresponding to the feature value based on the corresponding first prediction accuracy, which indicates an accuracy of performing recommendation based on the positive samples of the feature value, and determining the negative sample statistic corresponding to the feature value based on the corresponding second prediction accuracy, which indicates an accuracy of performing recommendation based on the negative samples of the feature value;

obtaining weight values corresponding to the combined features based on the positive sample statistics and the negative sample statistics corresponding to the feature values of the combined features;

constructing weight value sets corresponding to the plurality of feature combinations based on the weight values of the combined features; and respectively determining effectivenesses of the plurality of feature combinations based on the weight value sets of the plurality of feature combinations, the effectiveness being used for predicting an accuracy of performing content recommendation according to features obtained based on the corresponding feature combination.

2. The method according to claim 1, wherein the determining a positive sample statistic corresponding to each feature value of the combined feature and a negative sample statistic corresponding to the feature value of the combined feature comprises:

when the combined feature comprises one feature value, determining a positive sample statistic comprising the feature value as a positive sample statistic corresponding to the feature value; and determining a negative sample statistic comprising the feature value as a negative sample statistic corresponding to the feature value.

3. The method according to claim 1, wherein the determining a positive sample statistic corresponding to each feature value of the combined feature and a negative sample statistic corresponding to the feature value of the combined feature comprises:

determining a feature value statistic of the combined feature in positive samples comprising the feature value, and a feature value statistic of the combined feature in negative samples comprising the feature value;

determining the positive sample statistic corresponding to the feature value based on the feature value statistic of the combined feature in the positive samples comprising the feature value; and determining the negative sample statistic corresponding to the feature value based on the feature value statistic of the combined feature in the negative samples comprising the feature value.

4. The method according to claim 1, wherein the determining a positive sample statistic corresponding to each feature value of the combined feature and a negative sample statistic corresponding to the feature value of the combined feature comprises:

determining weight values of first samples and weight values of second samples, the first samples are selected according to a first proportion from positive samples comprising the feature value, and the second samples are selected according to a second proportion from negative samples comprising the feature value;

determining the positive sample statistic corresponding to the feature value based on the weight values of the first samples; and determining the negative sample statistic corresponding to the feature value based on the weight values of the second samples.

5. The method according to claim 1, wherein the determining a positive sample statistic corresponding to each feature value of the combined feature and a negative sample statistic corresponding to the feature value of the combined feature comprises:

determining weight values of positive samples comprising the feature value in a first part of samples and weight values of first samples in a second part of samples, the first samples are selected according to a first proportion from positive samples that belong to the second part of samples and comprise the feature value;

determining weight values of negative samples comprising the feature value in the first part of samples and weight values of second samples in the second part of samples, the second samples are selected according to a second proportion from negative samples that belong to the second part of samples and comprise the feature value;

determining the positive sample statistic corresponding to the feature value based on the weight values of the positive samples comprising the feature value in the first part of samples and the weight values of the first samples in the second part of samples; and determining the negative sample statistic corresponding to the feature value based on the weight values of the negative samples comprising the feature value in the first part of samples and the weight values of the second samples in the second part of samples.

6. The method according to claim 1, wherein the obtaining the weight values corresponding to the combined features based on the positive sample statistics and the negative sample statistics corresponding to the feature values comprises:

obtaining the weight values corresponding to the combined features based on the positive sample statistics and the negative sample statistics corresponding to the feature values by using the following formula:

$$w_{F,j} = \log \frac{N_j^+}{N_j^-};$$

wherein $w_{F,j}$ is the weight value of the combined feature; F is the corresponding feature combination; j is the feature value corresponding to the combined feature in the corresponding feature combination F; $N_j^+$ is the positive sample statistic corresponding to the feature value j; and $N_j^-$ and is the negative sample statistic corresponding to the feature value j.

7. The method according to claim 1, wherein the obtaining the weight values corresponding to the combined features based on the positive sample statistics and the negative sample statistics corresponding to the feature values comprises:

determining the weight value of the combined feature as 0 when $|N'w_{F,j}{}^0|$ is less than $\lambda_1$;

determining the weight value of the combined feature as a ratio of a difference to a first sum when $N'w_{F,j}{}^0$ is greater than $\lambda_1$, the difference being a difference between $N'w_{F,j}{}^0$ and $\lambda_1$, and the first sum being a sum of N' and $\lambda_2$; and determining the weight value of the combined feature as a ratio of a second sum to the first sum when $N'w_{F,j}{}^0$ is less than $-\lambda_1$, the second sum being a sum of $N'w_{F,j}{}^0$ and $\lambda_1$, both $\lambda_1$ and $\lambda_2$ being non-negative real numbers, N' being obtained according to a ratio of a product to a third sum, the product being a product of the positive sample statistic corresponding to the feature value and the negative sample statistic corresponding to the feature value, the third sum being a sum of the positive sample statistic corresponding to the feature value and the negative sample statistic corresponding to the feature value, and $w_{F,j}{}^0$ being obtained according to a ratio of the positive sample statistic corresponding to the feature value to the negative sample statistic corresponding to the feature value.

8. The method according to claim 1, wherein the positive sample represents sample data corresponding to clicked content among a plurality of pieces of displayed candidate recommendation content during display of the candidate recommendation content; and the negative sample represents sample data corresponding to unclicked content among the plurality of pieces of displayed candidate recommendation content during display of the candidate recommendation content.

9. The method according to claim 1, wherein the obtaining weight values comprises:

inputting the feature values of the combined features into a weight calculation model, to obtain the weight values of the combined features outputted by the weight calculation model.

10. The method according to claim 1, wherein the respectively determining effectivenesses of the plurality of feature combinations based on the weight value sets of the plurality of feature combinations comprises:

for each of the weight value sets, combining weight values of all combined features in the weight value set to obtain a score of each of the plurality of feature combinations; and respectively determining the effectivenesses of the plurality of feature combinations based on the scores of the plurality of feature combinations.

11. The method according to claim 10, wherein the respectively determining the effectivenesses of the plurality of feature combinations based on the scores of the plurality of feature combinations comprises:

comparing the scores of the plurality of feature combinations with a target score, to obtain comparison results respectively corresponding to the plurality of feature combinations; and determining the effectivenesses corresponding to the plurality of feature combinations based on the comparison results.

12. The method according to claim 1, further comprising:

selecting a target quantity of feature combinations from the feature combination set as target feature combinations based on rankings of the effectivenesses of the plurality of feature combinations;

performing feature combination on the original features based on the target feature combinations to obtain target combined features; and performing content recommendation based on the target combined features.

13. The method according to claim 1, further comprising:

selecting a target quantity of feature combinations from the feature combination set as first candidate feature combinations based on ranking of the effectivenesses of the plurality of feature combinations;

generating a plurality of second candidate feature combinations based on the first candidate feature combinations and the original features;

selecting a feature combination meeting a selecting condition from the plurality of second candidate feature combinations as a target feature combination;

performing feature combination on the original features based on the target feature combination to obtain a target combined feature; and performing content recommendation based on the target combined feature.

14. The method according to claim 12, wherein the performing content recommendation based on the target combined features comprises:

inputting the target combined features as input features into a click-through rate (CTR) prediction model, to obtain a CTR of a target user on the candidate recommendation content;

selecting a target quantity of pieces of content from the candidate recommendation content as target recommendation content based on the CTR; and returning the target recommendation content to the target user.

15. An electronic device, comprising:

a processor, a memory, and executable instructions stored in the memory; and the executable instructions stored in the memory, when executed by the processor, causing the electronic device to perform a feature effectiveness assessment method including:

constructing a feature combination set comprising a plurality of feature combinations, each feature combination being a combination of original features of candidate recommendation content;

obtaining feature value sets each of which corresponds to a corresponding feature combination of the plurality of feature combinations, each feature value set comprising feature values of combined features based on the corresponding feature combination;

for each of the combined features, determining a positive sample statistic corresponding to each feature value of the combined feature and a negative sample statistic corresponding to the feature value of the combined feature, wherein the determining the positive sample statistic and the negative sample statistic comprises:

determining a corresponding first prediction accuracy when positive samples comprising the feature value are training samples and a corresponding second prediction accuracy when negative samples comprising the feature value are training samples, determining the positive sample statistic corresponding to the feature value based on the corresponding first prediction accuracy, which indicates an accuracy of performing recommendation based on the positive samples of the feature value, and determining the negative sample statistic corresponding to the feature value based on the corresponding second prediction accuracy, which indicates an accuracy of performing recommendation based on the negative samples of the feature value;

obtaining weight values corresponding to the combined features based on the positive sample statistics and the negative sample statistics corresponding to the feature values of the combined features;

constructing weight value sets corresponding to the plurality of feature combinations based on the weight values of the combined features; and respectively determining effectivenesses of the plurality of feature combinations based on the weight value sets of the plurality of feature combinations, the effectiveness being used for predicting an accuracy of performing content recommendation according to features obtained based on the corresponding feature combination.

16. A non-transitory computer-readable storage medium, storing executable instructions, the executable instructions, when executed by a processor of an electronic device, causing the electronic device to perform a feature effectiveness assessment method including:

constructing a feature combination set comprising a plurality of feature combinations, each feature combination being a combination of original features of candidate recommendation content;

obtaining feature value sets each of which corresponds to a corresponding feature combination of the plurality of feature combinations, each feature value set comprising feature values of combined features based on the corresponding feature combination;

for each of the combined features, determining a positive sample statistic corresponding to each feature value of the combined feature and a negative sample statistic corresponding to the feature value of the combined feature, wherein the determining the positive sample statistic and the negative sample statistic comprises:

determining a corresponding first prediction accuracy when positive samples comprising the feature value are training samples and a corresponding second prediction accuracy when negative samples comprising the feature value are training samples, determining the positive sample statistic corresponding to the feature value based on the corresponding first prediction accuracy, which indicates an accuracy of performing recommendation based on the positive samples of the feature value, and determining the negative sample statistic corresponding to the feature value based on the corresponding second prediction accuracy, which indicates an accuracy of performing recommendation based on the negative samples of the feature value;

obtaining weight values corresponding to the combined features based on the positive sample statistics and the negative sample statistics corresponding to the feature values of the combined features;

constructing weight value sets corresponding to the plurality of feature combinations based on the weight values of the combined features; and respectively determining effectivenesses of the plurality of feature combinations based on the weight value sets of the plurality of feature combinations, the effectiveness being used for predicting an accuracy of performing content recommendation according to features obtained based on the corresponding feature combination.

* * * * *